(12) United States Patent
Watanabe et al.

(10) Patent No.: US 7,969,634 B2
(45) Date of Patent: Jun. 28, 2011

(54) OPTICAL SCANNING DEVICE AND IMAGE FORMING APPARATUS

(75) Inventors: Naoto Watanabe, Kanagawa (JP); Yoshinori Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 400 days.

(21) Appl. No.: 12/021,850

(22) Filed: Jan. 29, 2008

(65) Prior Publication Data
US 2008/0204840 A1  Aug. 28, 2008

(30) Foreign Application Priority Data

Feb. 28, 2007  (JP) ................................. 2007-048207
Jun. 4, 2007  (JP) ................................. 2007-147936

(51) Int. Cl.
G02B 26/08  (2006.01)
(52) U.S. Cl. .................... 359/204.1; 359/216.1; 347/243
(58) Field of Classification Search .... 359/196.1–226.3; 347/225–261
See application file for complete search history.

(56) References Cited

U.S. PATENT DOCUMENTS

| | | | | |
|---|---|---|---|---|
| 6,075,636 A * | 6/2000 | Sekikawa | .................... | 359/204.1 |
| 6,462,853 B2 | 10/2002 | Hayashi | | |
| 6,788,444 B2 | 9/2004 | Suzuki et al. | | |
| 7,068,296 B2 | 6/2006 | Hayashi et al. | | |
| 7,085,031 B2 * | 8/2006 | Tomioka | .................... | 359/205.1 |
| 7,106,483 B2 | 9/2006 | Hayashi et al. | | |
| 7,142,339 B2 * | 11/2006 | Tomioka | .................... | 359/196.1 |
| 7,218,432 B2 | 5/2007 | Ichii et al. | | |
| 7,253,937 B2 | 8/2007 | Ueda et al. | | |
| 7,265,886 B2 * | 9/2007 | Yoshikawa et al. | ........ | 359/216.1 |
| 7,271,823 B2 | 9/2007 | Izumi et al. | | |
| 7,271,824 B2 | 9/2007 | Omori et al. | | |
| 2006/0077500 A1 | 4/2006 | Hayashi et al. | | |
| 2006/0209373 A1 * | 9/2006 | Kato | ............................. | 359/204 |
| 2006/0232659 A1 | 10/2006 | Hayashi et al. | | |
| 2006/0245009 A1 | 11/2006 | Akiyama et al. | | |
| 2006/0284968 A1 | 12/2006 | Hayashi et al. | | |
| 2007/0058255 A1 | 3/2007 | Imai et al. | | |
| 2007/0211324 A1 | 9/2007 | Sakai et al. | | |
| 2007/0253048 A1 | 11/2007 | Sakai et al. | | |
| 2007/0297036 A1 | 12/2007 | Nakamura et al. | | |

FOREIGN PATENT DOCUMENTS

| | | |
|---|---|---|
| JP | 2003-270577 | 9/2003 |
| JP | 2005-250319 | 9/2005 |
| JP | 3820725 | 6/2006 |

OTHER PUBLICATIONS

U.S. Appl. No. 12/186,808, filed Aug. 6, 2008, Watanabe, et al.

* cited by examiner

*Primary Examiner* — James Phan
(74) *Attorney, Agent, or Firm* — Oblon, Spivak, McClelland, Maier & Neustadt, L.L.P.

(57) ABSTRACT

An optical scanning device includes a light source, a deflector, and an image-forming optical system. The deflector includes a deflecting surface for deflecting light beams in a main scanning direction. The image-forming optical system includes two relay lenses having a positive power in the main scanning direction. The relay lenses cause main light beams of light beams emitted from the light source to cross near the deflecting surface in the main scanning direction.

8 Claims, 19 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese priority documents 2007-048207 filed in Japan on Feb. 28, 2007 and 2007-147936 filed in Japan on Jun. 4, 2007.

BACKGROUND OF THE INVENTION

1. Field of the Invention

The present invention relates to an optical scanning devices and an image forming apparatus.

2. Description of the Related Art

As an example of an image forming apparatus that forms an image by using the Carlson process, an image forming apparatus has been known in which, a surface of a rotating photosensitive drum is scanned with light beams to form a latent image thereon and a toner image developed from the latent image is fixed onto a sheet as a recording medium to form an image. In recent years, image forming apparatuses of this type have been often used for quick printing as an on-demand printing system, and there have been ever increasing demands for high-image density and high-speed image output.

In general, high-speed image output can be achieved by increasing the number of revolutions of a deflector that deflects light beams and the number of revolutions of the photosensitive drum to increase the printing speed. However, if the number of revolutions of the deflector increases, vibrations and noise occurring from its driving system increase and, power consumption also increases, resulting in low durability of the apparatus. Besides, because high-image density and high-speed image output have a trade-off relation, if the number of revolutions of the deflector increases, image quality is impaired.

As one method of achieving both high-image density and high-speed image output, an image forming apparatus has been proposed in which a light source is formed as a multi-beam unit and a photosensitive drum is scanned with a plurality of light beams at one time. In this image forming apparatus, diverging rays from a vertical cavity surface-emitting laser (VCSEL) serving as a light source of light beams and having a plurality of light-emitting sources are collectively deflected by a deflector. Thus, the photosensitive drum can be scanned with the light beams simultaneously.

For example, Japanese Patent Application Laid-open Publication No. 2003-270577 discloses an optical scanning device using an overfield optical system has been suggested in which the width of the deflecting surface of the deflector that deflects a plurality of light beams is smaller than the radiation range of the light beams. By using such an overfield optical system, the width of the deflecting surface can be decreased. Therefore, compared with a conventional deflector with the same diameter (a diameter of a circle in which the deflector is inscribed with a rotational axis as a center), more deflecting surfaces can be provided. For this reason, the scanning speed can be increased without increasing the number of revolutions of the deflector.

However, in the optical scanning device using an overfield optical system, the distribution of the light amount of the light beams reflected upon the deflecting surface is disadvantageously uneven. Moreover, in the VCSEL explained above, for example, because the angle of light-beam divergence is small, the distribution of the light amount the light beams incident upon the deflecting surface is slightly uneven compared with an edge-emitting laser and the like. Therefore, to combine the surface-emitting light source and the overfield optical system together, a technology is required that equalizes the distribution of the light amount of the light beams.

SUMMARY OF THE INVENTION

It is an object of the present invention to at least partially solve the problems in the conventional technology According to an aspect of the present invention, there is provided an optical scanning device. The optical scanning device includes a deflector that includes a deflecting surface for deflecting a plurality of light beams for scanning in a main scanning direction; and an image-forming optical system that focuses the light beams near the deflecting surface in a sub-scanning direction perpendicular to the main scanning direction. The image-forming optical system includes at least two elements having a positive power in the main scanning direction. The size of the deflecting surface in the main scanning direction is smaller than a width of a light flux of the light beams in the main scanning direction.

According to another aspect of the present invention, there is provided an optical scanning device. The optical scanning device includes a first optical system that includes a coupling lens that couples a plurality of light beams; a deflector that includes a deflecting surface for deflecting the light beams having passed through the coupling lens; and a second optical system that focuses the light beams deflected by the deflector on a to-be-scanned surface. The to-be-scanned surface includes a writing area that is scanned with the light beams from a write-start position to a write-end position in a main scanning direction. A focal length of the coupling lens with respect to a distance between the deflecting surface and the coupling lens is larger than 1 and smaller than 4. The size of the deflecting surface in the main scanning direction is smaller than a width of a light flux of the light beams in the main scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
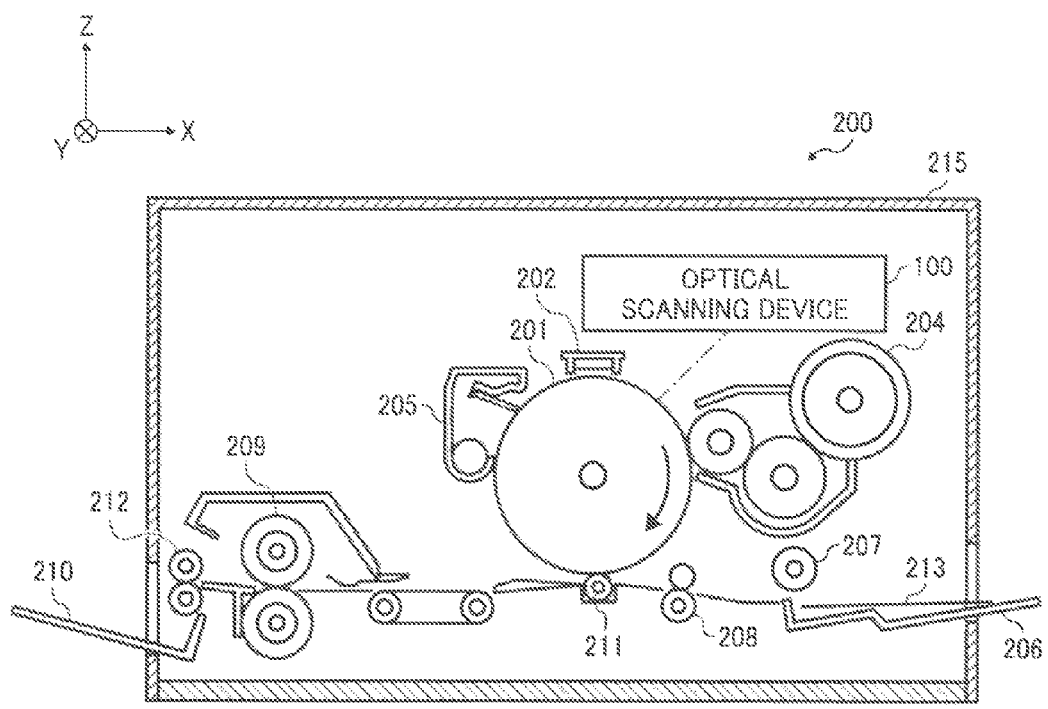
FIG. 1 is a schematic diagram of an image forming apparatus according to a first embodiment of the present invention.

FIG. 1 is a schematic diagram of an image forming apparatus 200 according to a first embodiment of the present invention.

The image forming apparatus 200 is explained as, for example, a printer that prints an image by using the Carlson process to transfer a toner image onto a recording medium (sheet). The image forming apparatus 200 includes an optical scanning device 100, a photosensitive drum 201, an electric charger 202, a toner cartridge 204, a cleaning case 205, a feed tray 206, a feed roller 207, a pair of registration rollers 208, a transfer charger 211, fixing rollers 209, eject rollers 212, an eject tray 210, and a housing 215 that accommodates these components.

The housing 215 has a substantially rectangular parallelepiped shape, and has formed on its +X side and -X side an opening communicating with an internal space.

The optical scanning device 100 is disposed in an upper position inside the housing 215, and deflects a light beam modulated based on image information to a main scanning direction (Y-axis direction in FIG. 1), thereby scanning the surface of the photosensitive drum 201.

The photosensitive drum 201 is a columnar member having on its surface a photosensitive layer that, when irradiated with light beams, becomes conductive. The photosensitive drum 201 is disposed below the optical scanning device 100 with a Y-axis direction as a longitudinal direction, and rotates clockwise (direction indicated by an arrow in FIG. 1) by a rotating mechanism (not shown). In the surrounding, the electric charger 202 is disposed at a twelve o'clock position (upper side) in FIG. 1, the toner cartridge 204 is disposed at a two o'clock position, the transfer charger 211 is disposed at a six o'clock position, and the cleaning case 205 is disposed at a ten o'clock position.

The electric charger 202 is disposed to the surface of the photosensitive drum 201 via a predetermined clearance to charge the surface of the photosensitive drum 201 with a predetermined voltage.

The toner cartridge 204 includes, for example, a cartridge body filled with toner and a developing roller charged with a voltage having a polarity opposite to that of the photosensitive drum 201 to supply toner filled in the cartridge body to the surface of the photosensitive drum 201 via the developing roller.

The cleaning case 205 includes a cleaning blade in a rectangular shape with the Y-axis direction as a longitudinal direction, and is disposed so that one end of the cleaning blade is in contact with the surface of the photosensitive drum 201. The toner adsorbed onto the surface of the photosensitive drum 201 is peeled off by the cleaning blade according to the rotation of the photosensitive drum 201, and is then collected inside of the cleaning case 205.

The transfer charger 211 is disposed to the surface of the photosensitive drum 201 via a predetermined clearance, and is applied with a voltage having a polarity opposite to that of the electric charger 202.

The feed tray 206 is disposed in a manner such that an end on a +X side protrudes from an opening formed on a +X side wall of the housing 215, and can accommodate a plurality of sheets 213.

The feed roller 207 takes out one sheet 213 by one sheet 213 from the feed tray 206 to lead the sheet to a space formed between the photosensitive drum 201 and the transfer charger 211 via the registration rollers 208 formed of paired rotating rollers.

The fixing rollers 209 are formed of paired rotating rollers to heat and press the sheet 213 and then lead it to the eject rollers 212.

The eject rollers 212 are formed of paired rotating rollers to sequentially stack the sheets 213 sent from the fixing rollers 209 onto the eject tray 210 disposed in a manner such that an end on a -X side protrudes from the opening formed on a -X side wall of the housing 215.

Figure 2:
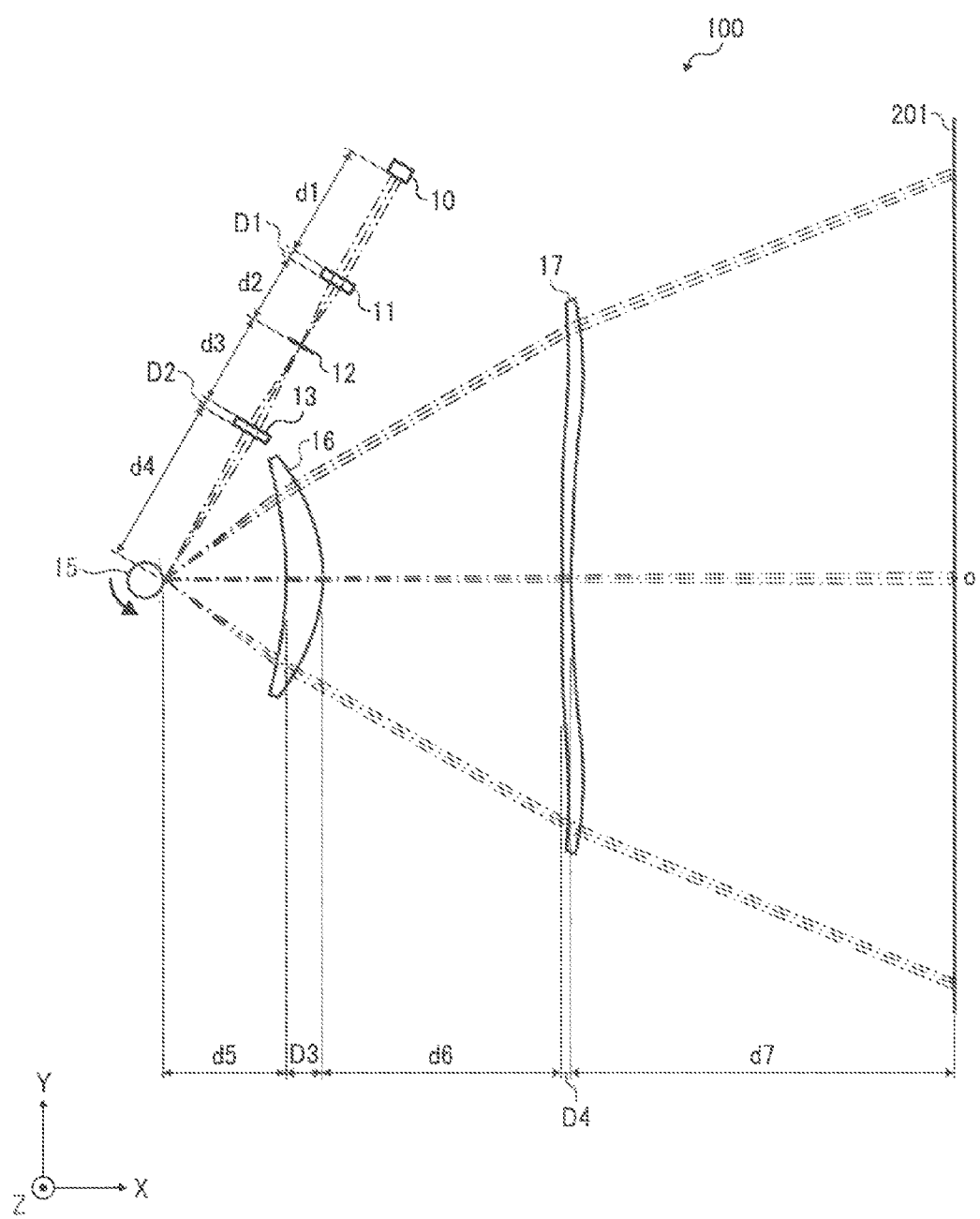
FIG. 2 is a schematic diagram of an optical scanning device shown in FIG. 1.

FIG. 2 is a schematic diagram of the optical scanning device 100. The optical scanning device 100 includes a light source 10; a coupling lens 11, an aperture member 12, a collimate lens 13, and a polygon mirror 15 that are arranged in this order from the light source 10 at 60 degrees toward a forward-slash direction in FIG. 2; and a first scanning lens 16 and a second scanning lens 17 that are arranged in this order on the +X side of the polygon mirror 15.

Figure 3:
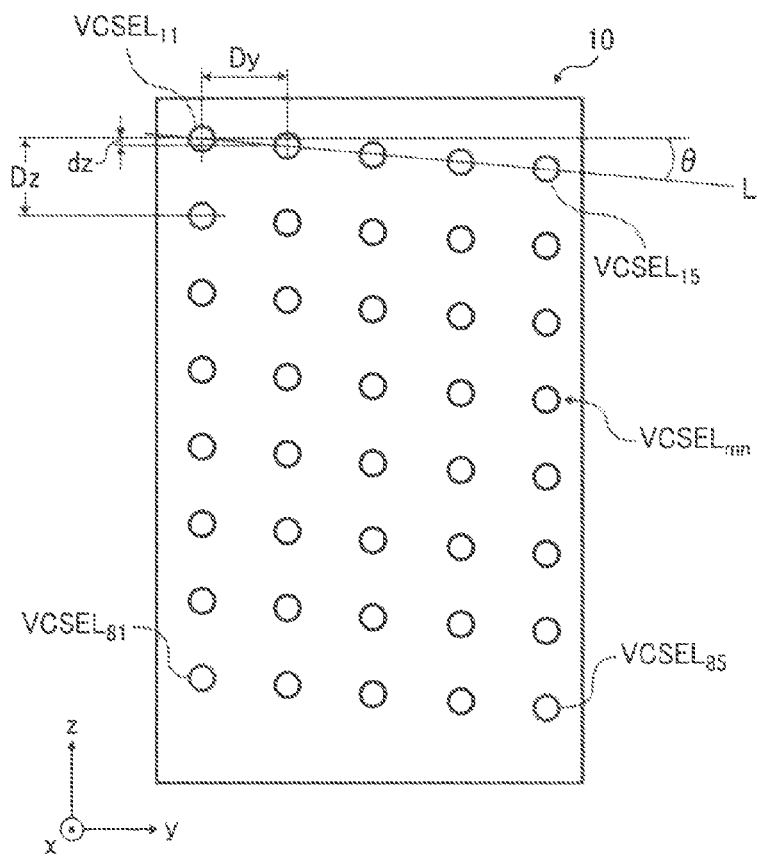
FIG. 3 is a schematic diagram of a light source shown in FIG. 2.

The light source 10 serves as a light-emitting source, which is, for example, a surface-emitting semiconductor laser array in which VCSELs are two dimensionally disposed. As shown in FIG. 3, 40 VCSELs are disposed on a light-emitting surface (the surface on the -x side) in a matrix of 8×5 with a direction parallel to a straight line L forming an angle θ with the y axis as a row direction and a direction parallel to a z axis as a column direction. Each VCSEL has a diameter of a near-field pattern of 4 micrometers, and light beams with a wavelength of 780 nanometers are emitted with angles of divergence in the main scanning direction and the sub-scanning direction being taken as seven±one degrees. Also, in the first embodiment, a row spacing Dz is 24.0 micrometers, and a column spacing Dy is 23.9 micrometers. A space dz between adjacent VCSELs in a Z-axis direction (sub-scanning direction) of each VCSEL is 4.8 micrometer (=Dz/5). In the following explanation, as shown in FIG. 3, a VCSEL on a m-th row and an n-th column is represented by $VCSEL_{mn}$ for convenience.

Figure 4:
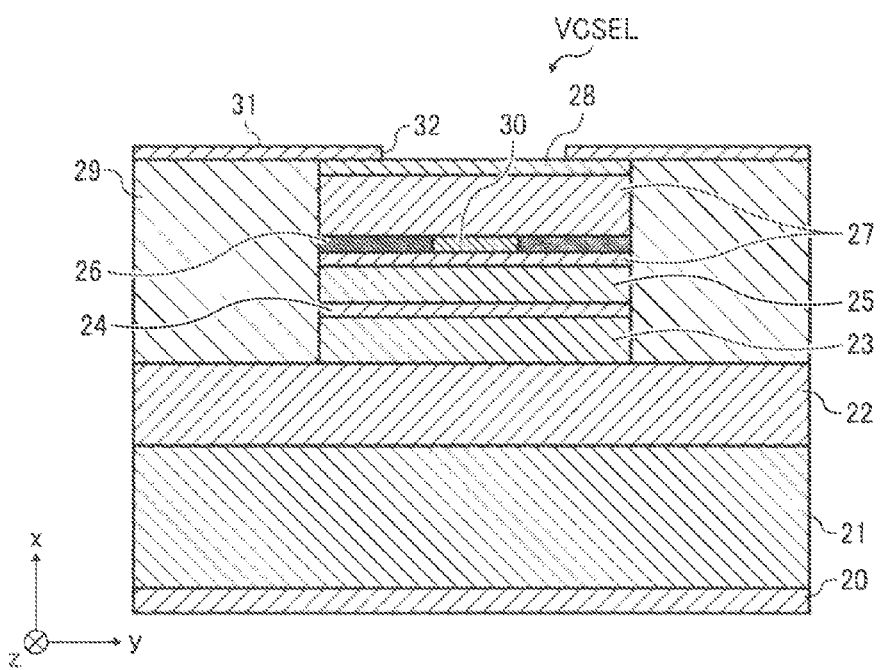
FIG. 4 is a cross section of a VCSEL of the light source.
Figure 5:
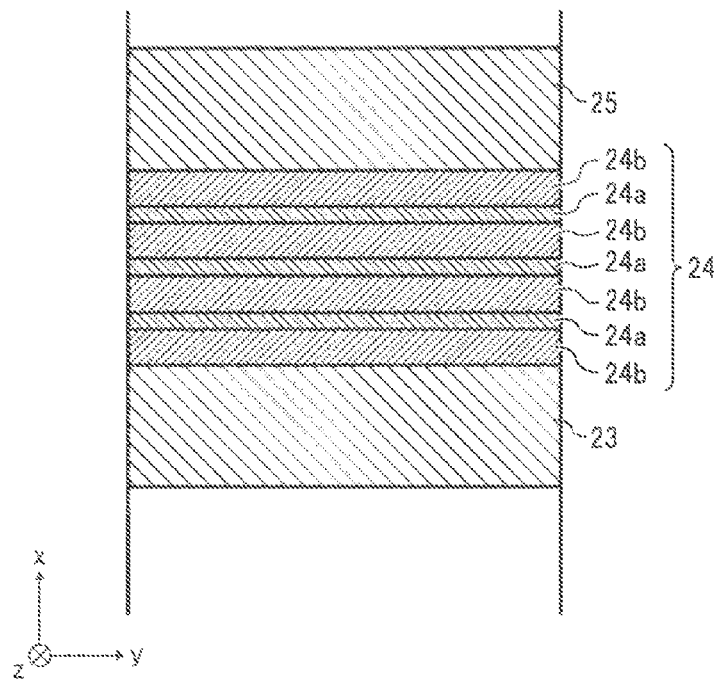
FIGS. 5 and 6 are enlarged views of an active layer of the VCSEL.

FIG. 4 is a cross section of a VCSEL. FIG. 5 is an enlarged view around an active layer 24 of the VCSEL. As can been seen from FIGS. 4 and 5, the VCSEL is a 780 nm (nanometer)-band VCSEL, in which the active layer 24 including an $Al_{0.12}Ga_{0.88}As$ quantum-well layer 24a and a $Al_{0.3}Ga_{0.7}As$ barrier layer 24b is formed on an n-GaAs substrate 21 on which an n-side electrode 20 is formed, the active layer 24 as being interposed $Al_{0.6}GA_{0.4}As$ spacer layers 23 and 22. Also, a resonator area having one wavelength optical thickness including the active layer 24 and the spacer layers 23 and 25 is interposed between a lower reflecting mirror 22 and an upper reflecting mirror 27, the lower reflecting mirror 22 formed of an n-$Al_{0.3}Ga_{0.7}As$ high-refractivity layer and an n-$Al_{0.9}Ga_{0.1}As$ low-refractivity layer, each layer having a λ/4 optical thickness and 40.5 pairs, and the upper reflecting mirror 27 formed of a p-$Al_{0.3}Ga_{0.7}As$ high-refractivity layer and an p-$Al_{0.9}Ga_{0.1}As$ low-refractivity layer, each layer having 24 pairs. Also, an AlAs selected oxide layer 30 surrounded by an $Al_xO_y$ current-narrowing layer 26 is provided on the upper reflecting mirror 27 positioned away from the resonator area by $\lambda/4$. Between the layers of the reflecting mirrors 22 and 27 is a composition-tilted layer (not shown) in which composition is gradually changed to reduce a resistance value.

Explained below is a method of forming the VCSEL provided to the light source 10. First, each layer is created through a crystal growth method using metal-organic chemical vapor deposition method (MOCVD method) or molecular beam epitaxy method (MBE method).

Next, a mesa shape is formed around the area to be an element area through dry etching by forming a trench having a depth of 4.5 micrometers. In general, an etching bottom surface is provided on a portion at least over the AlAs selected oxide layer 30.

Next, the AlAs selected oxide layer 30 with its side surface exposed through the trench forming process through etching is subject to heat treatment in water vapor for oxidation of the surrounding to change into an insulator layer of $Al_xO_y$. With this, a current-narrowing structure is formed in which a path of an element-driving current is restricted to the center AlAs area not oxidized.

Next, a $SiO_2$ protective layer (not shown) having a thickness of, for example, 150 nanometers, is formed on an area other than an area on each element area where an upper electrode 31 is formed and a light-emitting unit 32. Furthermore, an etching portion is buried with polyimide 29 for planarization.

Next, a p-contact layer 28, polyimide on the upper reflecting mirror where the light-emitting unit is present, and the $SiO_2$ protective layer (not shown) are removed, and a P-side separate electrode 31 is formed on an area other than the light-emitting unit 32 on the p-contact layer 28, and an n-side electrode is formed on a lower surface of the n-GaAs substrate 21.

In the first embodiment, the mesa portion formed through dry etching serves as a surface-emitting laser element. The arrangement of the VCSELs of the light source 10 can be achieved by forming a photomask along the arrangement of the light-emitting sources, and then forming a mask for etching by a normal photolithography process, and then performing etching. To electrically and spatially isolate the respective elements of the array, a groove between the elements is preferable on the order of 4 to 5 micrometers. If the groove is too narrow, etching is difficult to control. Also, the mesa portion can take an arbitrary shape, such as a circle, oval, square, or rectangular. Furthermore, the size or dimension (for example, diameter) is preferably equal to or more than about 10 micrometers. If the size is too small, heat is accumulated and the light-emitting property deteriorates.

Figure 6:
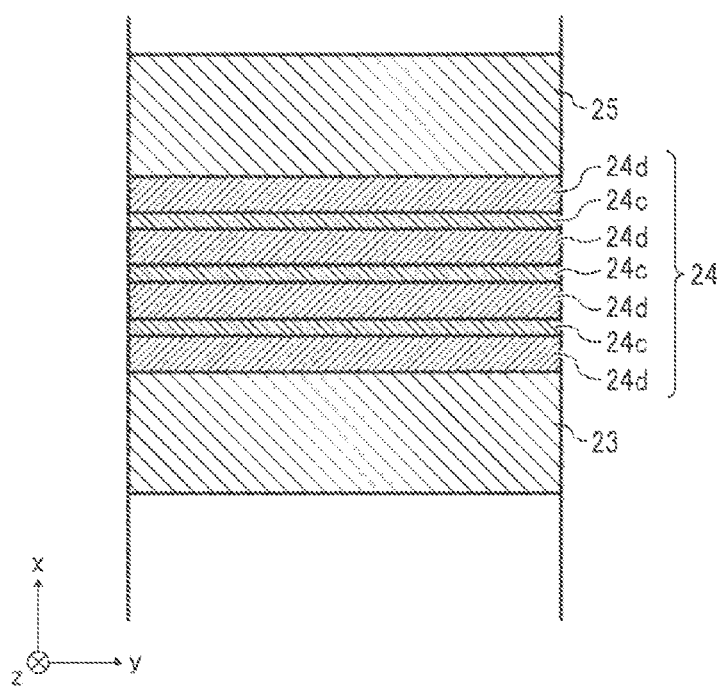

The surface-emitting laser of a 780 nm-band can be fabricated of another material. FIG. 6 is an enlarged view around the active layer 24 made of another material. As shown in FIG. 6, in this surface-emitting laser, the active layer includes three GaInPAs quantum-well active layers 24c with a compression-distortion composition and having a band-gap wavelength of 780 nanometers and four $Ga_{0.6}In_{0.4}P$ barrier layers 24d with tensile distortion with lattice matching. Also, $(Al_{0.7}Ga_{0.3})_{0.5}In_{0.5}P$ of a wide-band gap is used as clad layers 23 and 25 (spacer layers in the first embodiment) to trap electrons. Compared with the case where the clad layer for trapping carriers is formed of an AlGaAs group, an extremely large band-gap difference between the clad layer and the quantum-well active layer can be taken.

Table 1 depicts a band-gap difference between the spacer layer and the well layer and between the barrier layer and the well layer among AlGaAs (spacer layer)/AlGaAs (quantum-well active layer) 780-nm and 850-nm surface-emitting semiconductor lasers and an AlGaInP (spacer layer)/GaInPAs (quantum-well active layer) 780-nm surface-emitting semiconductor laser, those lasers having a typical material composition. The spacer layer is normally arranged between the active layer and the reflecting mirror, and serves as a clad layer for trapping carriers.

As shown in Table 1, it can been found that, according to the AlGaInP (spacer layer)/GaInPAs (quantum-well active layer) 780-nm surface-emitting semiconductor laser, a larger band-gap difference can be obtained compared with the AlGaAs/AlGaAs 780-nm surface-emitting semiconductor laser and the AlGaAs/AlGaAs 850-nm surface-emitting semiconductor laser. Specifically, the band-gap difference between the clad layer and the active layer is 767.3 megaelectron volts, which is extremely large compared with 465.9 megaelectron volts achieved when the clad layer is formed of AlGaAs. Similarly, there is an advantage also for the band-gap difference between the barrier layer and the active layer. Thus, excellent carrier trapping can be achieved.

TABLE 1

| | | WAVELENGTH | | |
| --- | --- | --- | --- | --- |
| | | 780 nm | | 850 nm(Ref.) |
| | | SPACER LAYER/QUANTUM-WELL ACTIVE LAYER AlGaAs/GaAs-MATERIAL | SPACER LAYER/QUANTUM-WELL ACTIVE LAYER AlGaAs/GaAs-MATERIAL | SPACER LAYER/QUANTUM-WELL ACTIVE LAYER AlGaAs/GaAs-MATERIAL |
| SPACER LAYER | | $Al_{0.6}Ga_{0.4}As$ (Eg = 2.0226 eV) | $(Al_xGa_{1-x})_{0.5}In_{0.5}P$ (Eg(X = 0.7) = 2.324 eV) | $Al_{0.6}Ga_{0.4}As$ (Eg = 2.0226 eV) |
| ACTIVE LAYER | QUANTUM-WELL ACTIVE LAYER | $Al_{0.12}Ga_{0.88}As$ (Eg = 1.5567 eV) | GaInPAs(COMPRESSION DISTORTION) (Eg = 1.5567 eV) | GaAs (Eg = 1.42 eV) |
| | BARRIER LAYER | $Al_{0.3}Ga_{0.7}As$ (Eg = 1.78552 eV) | $Ga_xIn_{1-x}P$(TENSILE DISTORTION) (Eg(X = 0.6) = 2.02 eV) | $Al_{0.3}Ga_{0.7}As$ (Eg = 1.78552 eV) |
| Eg DIFFERENCE BETWEEN SPACER | | 465.9 meV | 767.3 meV | 602.6 meV |

TABLE 1-continued

| | WAVELENGTH | | |
|---|---|---|---|
| | 780 nm | | 850 nm (Ref.) |
| | SPACER LAYER/QUANTUM-WELL ACTIVE LAYER AlGaAs/GaAs-MATERIAL | SPACER LAYER/QUANTUM-WELL ACTIVE LAYER AlGaAs/GaAs-MATERIAL | SPACER LAYER/QUANTUM-WELL ACTIVE LAYER AlGaAs/GaAs-MATERIAL |
| LAYER AND WELL LAYER Eg DIFFERENCE BETWEEN BARRIER LAYER AND WELL LAYER | 228.8 meV | 463.3 meV | 365.5 meV |

Also, since the active layer has a compression distortion, with a band separation of a heavy hole and a light hole, an increase in gain is large. Also, with the increase in gain, a low threshold and a high output are achieved. Such an effect cannot be achieved with an AlGaAs 780-nm or 850-nm wavelength surface-emitting laser having an approximately equal lattice constant to that of the GaAS substrate. Furthermore, by decreasing the threshold with an improvement in carrier trapping and an increase in gain by the distortion quantum-well active layer, reflectivity of the DBR on a light-extracting side can be decreased, resulting in a high output.

Furthermore, the active layer and the barrier layer are formed of a material not containing Al, and therefore are Al-free active areas (quantum-well active layer and its adjacent layers). Therefore, the amount of oxygen intake is decreased, which suppresses formation of a non-light-emitting recoupling center and therefore increases the life of the VCSEL.

Referring back to FIG. 2, the coupling lens 11 has a focal length of 24.7 millimeters, and substantially collimates light beams from the light source 10.

The aperture member 12 has an rectangular or oval aperture having a dimension in the y-axis direction (main scanning direction) of 5.44 millimeters and a dimension in the x-axis direction (sub-scanning direction) of 2.10 millimeters, with the center of the aperture being positioned at or near the focal point of the coupling lens 11.

The collimate lens 13 is a lens with a focal length of 54.0 millimeters and a refractivity in the main scanning direction (y-axis direction), and forms an image from out of the light beam passing through the aperture member 12 near the reflection plane of the polygon mirror 15 in the main scanning direction.

The polygon mirror 15 is a polygon-columnar member with its upper surface being in a shape of a dodecagon inscribed in a circle with a radius of 7 millimeters. This polygon mirror 15 have twelve side surfaces each on which a deflecting surface that deflects an incident light beam is formed, and is rotated by the rotating mechanism (not shown) at a constant angular velocity around an axis parallel to the z axis. With this, the light beams incident upon the polygon mirror 15 is used for scanning in the Y-axis direction.

The first scanning lens 16 and the second scanning lens 17 are scanning lenses made of, for example, resin, having a center thickness (on the optical axis) of 13.5 millimeters and 3.5 millimeters, respectively.

In the optical scanning device 100 explained above, the sub-scanning lateral magnification of the optical system (scanning optical system) after the polygon mirror 15 is 0.97.

Also, the focal length of the scanning optical system in the main scanning direction is 237.8 millimeters, and the focal length in the sub-scanning direction is 71.4 millimeters. The width of a writing area of the photosensitive drum 201 is within a range of ±105.0 millimeters in the main scanning direction (Y-axis direction), with a point O in FIG. 2 as a center. In FIG. 2, the point O is a point where a straight line passing through the rotation center of the polygon mirror 15 and parallel to the X axis and the surface to be scanned of the photosensitive drum 201 cross. A target spot diameter of the light beam on the surface of the photosensitive drum 201 is 52 micrometers in the main scanning direction and 55 micrometers in the sub-scanning direction. Also as shown in FIG. 2, optical distances between the light source 10 and the respective optical elements d1, d2, d3, d4, d5, d5, d6, and d7 and dimensions in the optical-axis direction of each element D1, D2, D3, and D4 are shown in the following Tables 2 and 3 by way of example.

TABLE 2

| IN MILLIMETERS | | | | | | |
|---|---|---|---|---|---|---|
| d1 | d2 | d3 | d4 | d5 | d6 | d7 |
| 46.06 | 24.7 | 83.85 | 108.53 | 46.31 | 89.73 | 141.36 |

TABLE 3

| IN MILLIMETERS | | | |
|---|---|---|---|
| D1 | D2 | D3 | D4 |
| 3.0 | 3.0 | 13.50 | 3.50 |

Explained below is the operation of the image forming apparatus 200. When image information is received from an upper apparatus, the optical scanning device 100 is driven with modulation data based on the image information. From the light source 10, 40 light beams modulated based on the image information are emitted. These light beams are coupled by the coupling lens 11, and then pass through the aperture member 12. With this, respective spot diameters are adjusted. Then, the light beams passing through the aperture member 12 are converged by the collimate lens 13 onto the deflecting surface of the polygon mirror 15.

Figure 7:
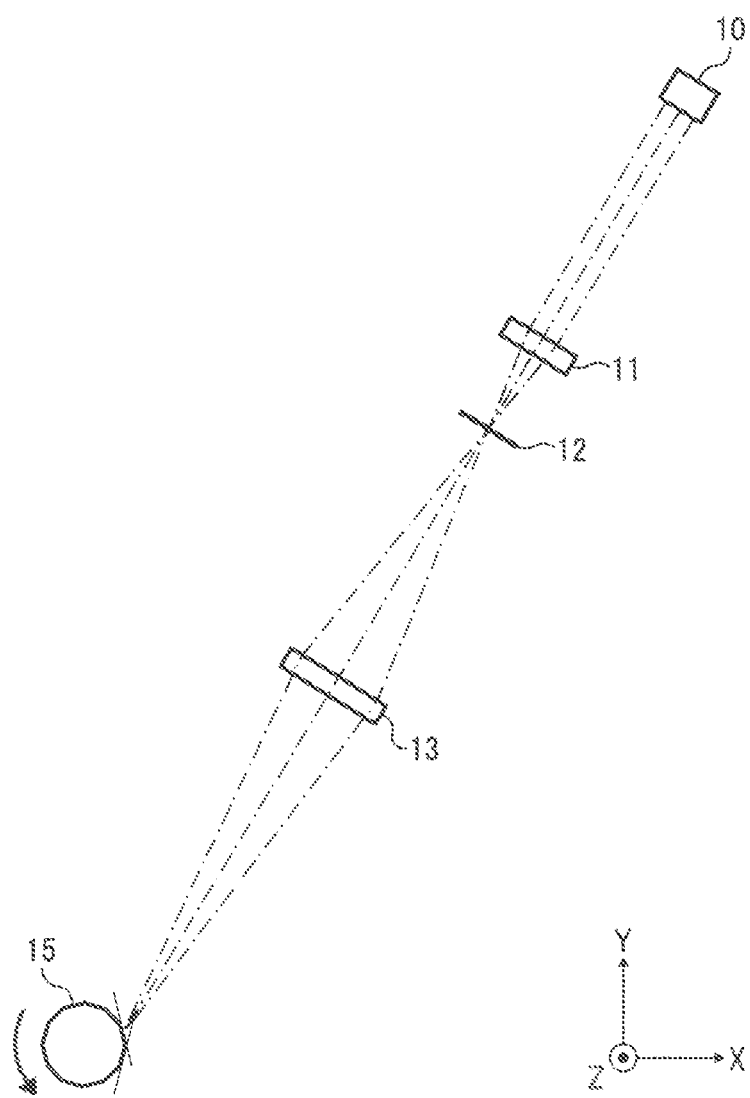
FIG. 7 is a schematic diagram for explaining effects of a relay lens system.

As shown in FIG. 7, main light beams of the light beams emitted from the light source 10 are converged by the collimate lens 13 having a refractivity in the main scanning direction near a certain point on the deflecting surface formed on the polygon mirror 15. With this, the light beam incident upon the deflecting surface are deflected with their light amounts not being uneven one another.

Figure 8A:
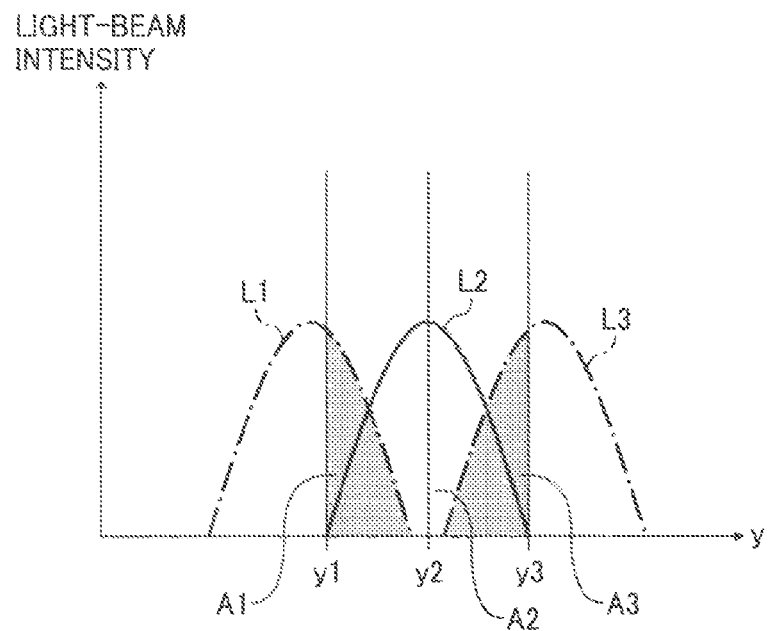
FIGS. 8A and 8B are other schematic diagrams for explaining effects of the relay lens system.

FIG. 8A is a schematic diagram for explaining intensities of light beams emitted from a $VCSEL_{13}$ positioned at the center on the first row and $VCSEL_{11}$ and $VCSEL_{15}$ positioned at both ends of the first row in the main scanning direction of the VCSELs of the light source 10 and incident upon a plane parallel to the deflecting surface of the polygon mirror 15 (hereinafter, "incident plane") as being separated away from one another by a predetermined distance in the main scanning direction. The horizontal axis in FIG. 8A represents position coordinates on the incident plane in the main scanning direction, whilst the vertical axis represents intensities of the light beams. Also, y2 represents position coordinates on the deflecting surface of the polygon mirror 15 at the center in the main scanning direction, and y1 and y3 represent position coordinates on the deflecting surface thereof at both ends in the main scanning direction. Furthermore, for convenience, the light beams from the $VCSEL_{11}$, the $VCSEL_{13}$, and $VCSEL_{15}$ are referred to as light beams $LB_{11}$, $LB_{13}$, and $LB_{15}$.

When the area near the center point O of the writing area of the photosensitive drum 201 is scanned with the light beams $LB_{11}$, $LB_{13}$, and $LB_{15}$ having the same intensity, each of the light beams $LB_{11}$, $LB_{13}$, and $LB_{15}$ is deflected onto a deflecting surface parallel to the Z axis. The intensity distributions on the incident planes of the light beams $LB_{11}$, $LB_{13}$, and $LB_{15}$ are represented by curves L1, L2, and L3, respectively, in FIG. 8A. Of three light beams $LB_{11}$, $LB_{13}$, and $LB_{15}$, two light beams $LB_{11}$ and $LB_{15}$ are only partially incident upon the deflecting surface. Therefore, the light amount of the light beam $LB_{11}$ after reflection upon the deflecting surface is proportional to an area A1 (shaded portion in FIG. 8A) defined by the curve L1, a line passing the position y1 and perpendicular to the Y axis, and the Y axis, whilst the light amount of the light beam $LB_{15}$ after reflection upon the deflecting surface is proportional to an area A3 (shaded portion in FIG. 8A) defined by the curve L3, a line passing the position y2 and perpendicular to the Y axis, and the Y axis. On the other hand, the light beam $LB_{13}$ is entirely incident upon the deflecting surface. Therefore, the light amount after reflection upon the deflecting surface is proportional to the area A2 defined by the curve L2 and the Y axis. That is, the light-amount ratios of the light beams $LB_{11}$, $LB_{13}$, and $LB_{15}$ are equal to area ratios of the areas A1, A2, and A3. Also, the light-amount ratio is larger for the light beam incident upon the center of the deflecting surface, whilst the light-amount ratio is smaller for the light beams incident to near edges at both ends of the deflecting surface in the main scanning direction.

Figure 8B:
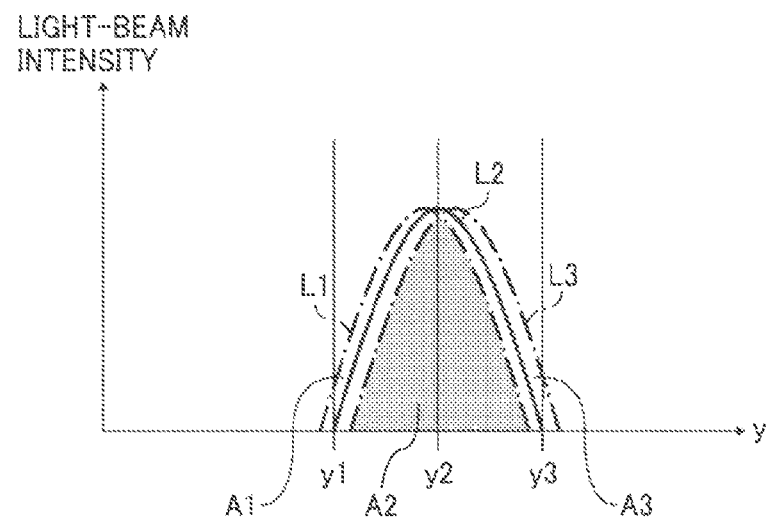

On the other hand, as shown in FIG. 7, when the main light beams of the light beams emitted from the light source 10 are converged by the collimate lens 13 having a refractivity in the main scanning direction near a certain point in the deflecting surface formed on the polygon mirror 15, curves representing the intensity distributions of the light beams are approximately overlaid each other, as shown in FIG. 8B. Therefore, when a plurality of light beams with their intensities even are emitted from the light source 10, the light amounts of the light beams reflected upon the deflecting surface are uniform.

As explained above, for each light beam deflected upon the deflecting surface of the rotating polygon mirror 15, a moving speed of a spot of the light beam in the main scanning direction and others are adjusted by the first scanning lens 16 and the second scanning lens 17. With this state, the light beams are focused on the surface of the photosensitive drum 201.

On the other hand, the surface of the photosensitive drum 201 is charged by the electric charger 202 with a predetermined voltage. Thus, charges are distributed with a certain charge density. When the photosensitive drum 201 is scanned with the light beam deflected by the polygon mirror, carriers (charges) are generated in a photosensitive layer at a portion where the light beam is incident. At this portion, charges are moved to decrease the potential. Therefore, with the photosensitive drum 201 rotating in the direction indicated by the arrow in FIG. 1 being scanned with the light beam modulated based on the image information, an electrostatic latent image defined by the charge distribution is formed on the surface.

When an electrostatic latent image is formed on the surface of the photosensitive drum 201, toner is supplied by the developing roller of the toner cartridge 204 onto the surface of the photosensitive drum 201. At this time, the developing roller of the toner cartridge 204 is charged with a voltage having a polarity opposite to that of the photosensitive drum 201. Accordingly, the toner attached to the developing roller is charged with the same polarity as that of the photosensitive drum 201. Thus, toner is not attached to a portion on the surface of the photosensitive drum 201 where charges are distributed, and toner is attached only to the scanned portion. As a result, the electrostatic latent image is developed into a toner (visible) image. After the toner image is transferred by the transfer charger 211 onto the sheet 213, the toner image is fixed by the fixing rollers 209 on the sheet 213. The sheet 213 with the image formed in this manner is delivered by the eject rollers 212, and is then stacked on the eject tray 210 in sequence.

As explained above, according to the first embodiment, the light amounts of the light beams deflected on the deflecting surface are substantially uniform. Therefore, scanning of the writing area of the photosensitive drum 201 is performed with a plurality of light beams with the same light amount. Thus, scanning can be performed over the entire writing area without unevenness.

Also, as shown in FIG. 3, 40 VCSELs formed on the light source 10 are two-dimensionally disposed on a plane parallel to a zy plane so that a distance between VCSELs farthest away from each other in the sub-scanning direction (Z-axis direction) (=148.0 micrometers) is longer than a distance between VCSELs farthest away from each other in the main scanning direction (Y-axis direction) (=95.6 micrometers). Therefore, unevenness of the light-amount distribution of the light beams deflected on the deflecting surface of the polygon mirror 15 can be avoided, which enables scanning of the surface to be scanned with high accuracy.

The image forming apparatus 200 also includes the optical scanning device 100. Therefore, based on the latent image formed on the photosensitive drum 201 from out of the light beams with an even light amount, a final image is formed. Therefore, an image can be formed on a sheet with high accuracy.

Figure 9:
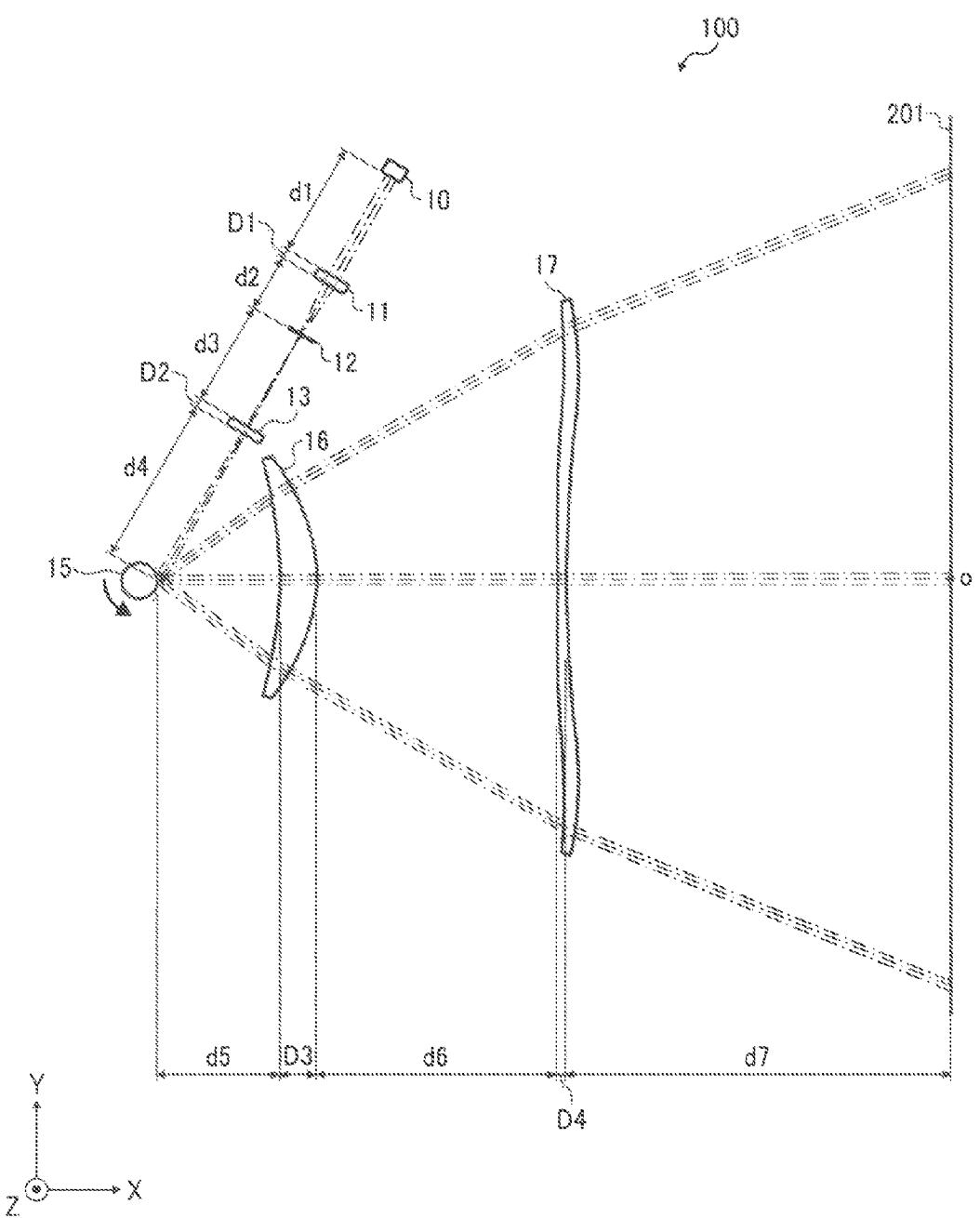
FIG. 9 is a schematic diagram of an optical scanning device according to a second embodiment of the present invention.

FIG. 9 is a schematic diagram of the optical scanning device 100 according to the second embodiment. The optical scanning device of the second embodiment is of basically similar configuration as the optical scanning device of the first embodiment. Therefore, like reference numerals refer to portions corresponding to those in the first embodiment, and the same description is not repeated.

The optical scanning device 100 includes the light source 10; the coupling lens 11, the aperture member 12, the collimate lens 13, and the polygon mirror 15 that are arranged in this order from the light source 10 at 60 degrees toward a forward-slash direction in FIG. 9; and the first scanning lens 16 and the second scanning lens 17 that are arranged in this order on the +X side of the polygon mirror 15.

The coupling lens 11 has a focal length of 47.7 millimeters, and substantially collimates light beams from the light source 10.

The collimate lens 13 is a lens with a focal length of 107.0 millimeters and a refractivity in the sub-scanning direction (Z-axis direction), and forms an image from out of the light beam passing through the aperture member 12 near the reflection plane of the polygon mirror 15 in the main scanning direction.

In the optical scanning device 100, the sub-scanning lateral magnification as the entire optical scanning device 100 is 2.18, and the sub-scanning lateral magnification of the optical system (scanning optical system) after the polygon mirror 15 is 0.97. Also, the focal length of the scanning optical system in the main scanning direction is 237.8 millimeters, and the focal length in the sub-scanning direction is 71.4 millimeters. The width of the writing area of the photosensitive drum 201 is within a range of ±105.0 millimeters in the main scanning direction (Y-axis direction), with a point O in FIG. 9 as a center. In FIG. 9, the point O is a point where a straight line passing through the rotation center of the polygon mirror 15 and parallel to the X axis and the surface to be scanned of the photosensitive drum 201 cross. A target spot diameter of the light beam on the surface of the photosensitive drum 201 is 52 micrometers in the main scanning direction and 55 micrometers in the sub-scanning direction. Also as shown in FIG. 9, optical distances between the light source 10 and the respective optical elements d1, d2, d3, d4, d5, d6, d7, and d8 and dimensions in the optical-axis direction of each element D1, D2, D3, and D4 are shown in the following Tables 4 and 5 by way of example.

TABLE 4

IN MILLIMETERS

| d1 | d2 | d3 | d4 | d5 | d6 | d7 |
|---|---|---|---|---|---|---|
| 46.06 | 10.32 | 56.5 | 53.0 | 46.31 | 89.73 | 141.36 |

TABLE 5

IN MILLIMETERS

| D1 | D2 | D3 | D4 |
|---|---|---|---|
| 3.0 | 3.0 | 13.50 | 3.50 |

Explained below is a relation among a scaling of the optical system, a near-field pattern of the light-emitting unit, and a beam-spot diameter.

Figure 10A:
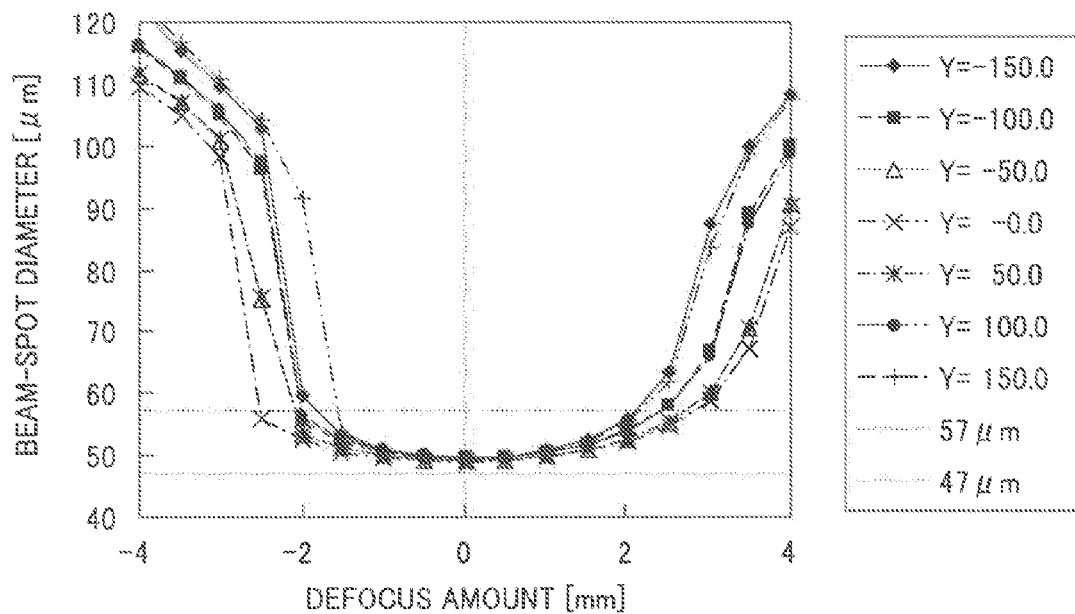
FIGS. 10A to 13B are schematic diagrams for explaining a relation between the beam-spot diameter and the defocus amount according to the second embodiment.
Figure 10B:
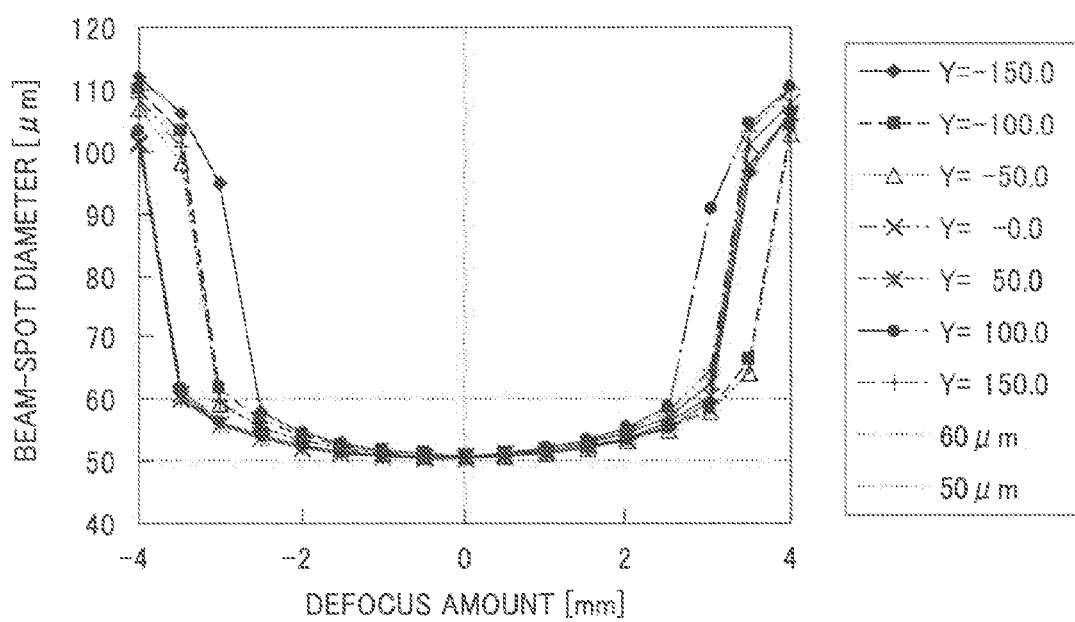
Figure 11A:
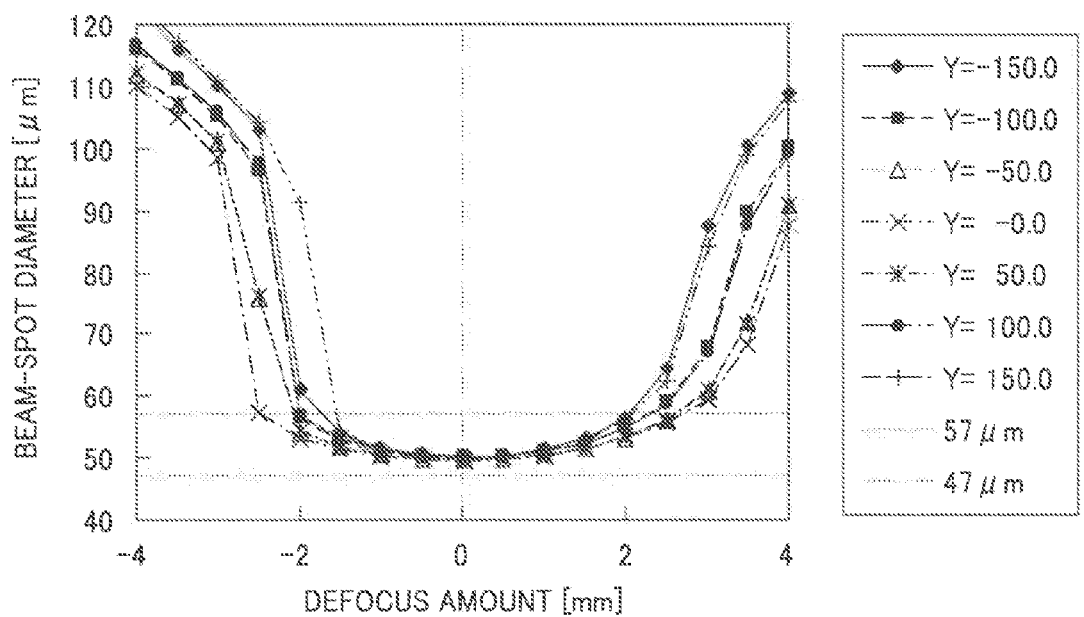
Figure 11B:
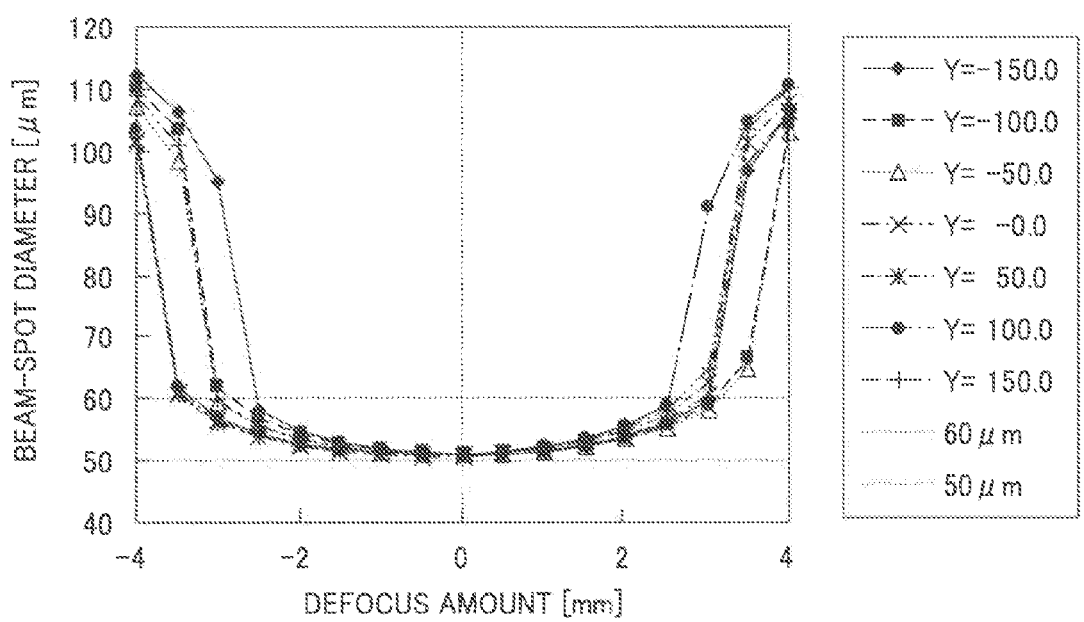
Figure 12A:
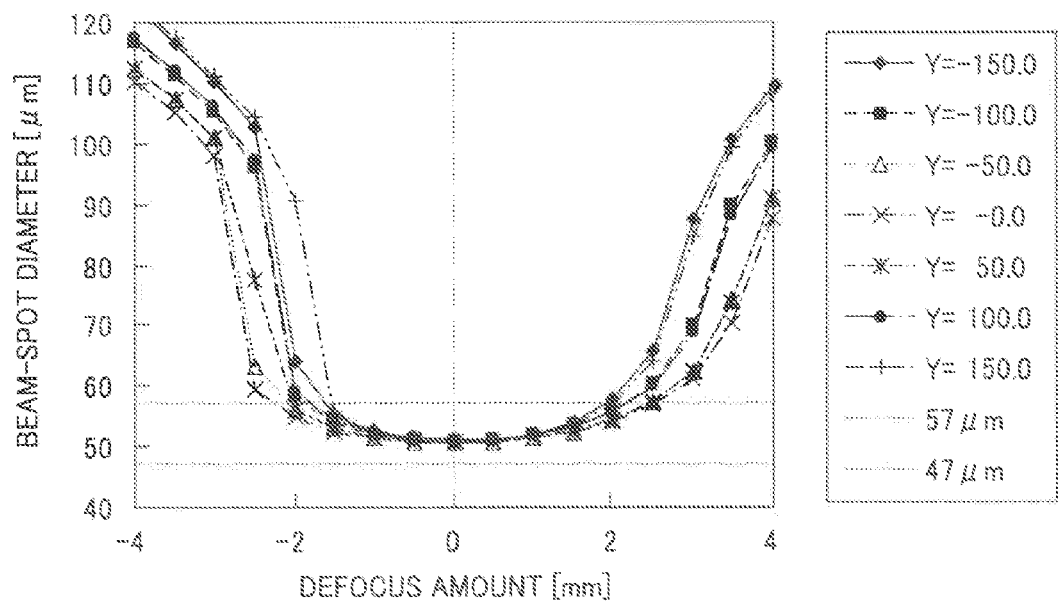
Figure 12B:
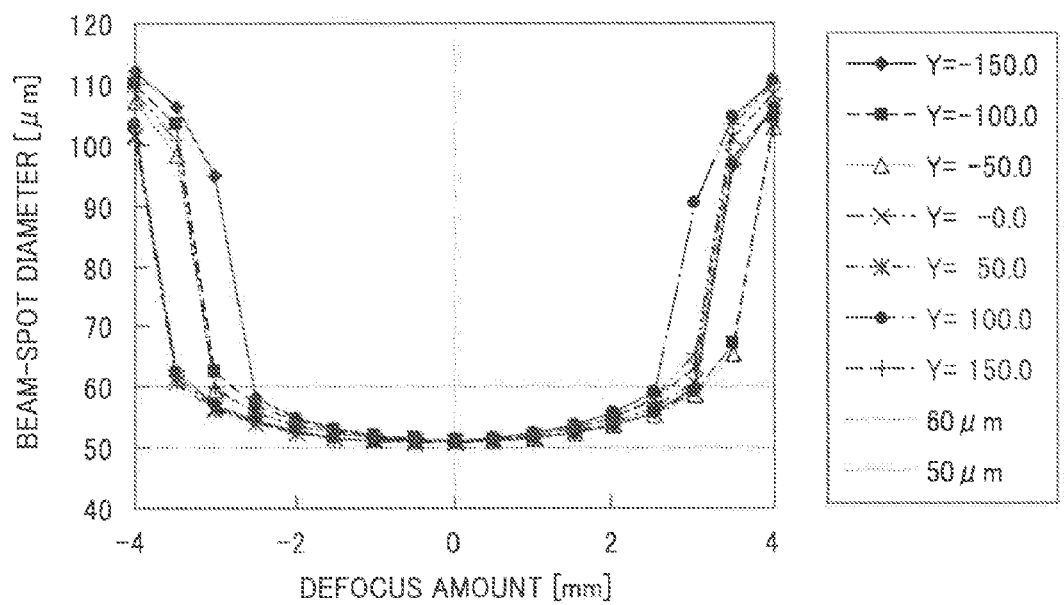
Figure 13A:
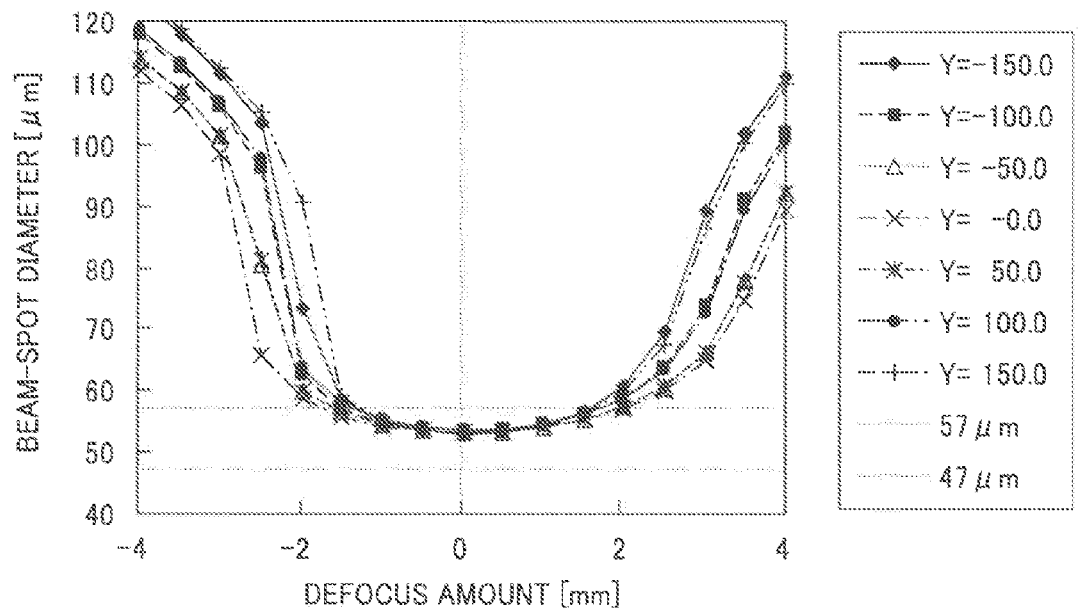
Figure 13B:
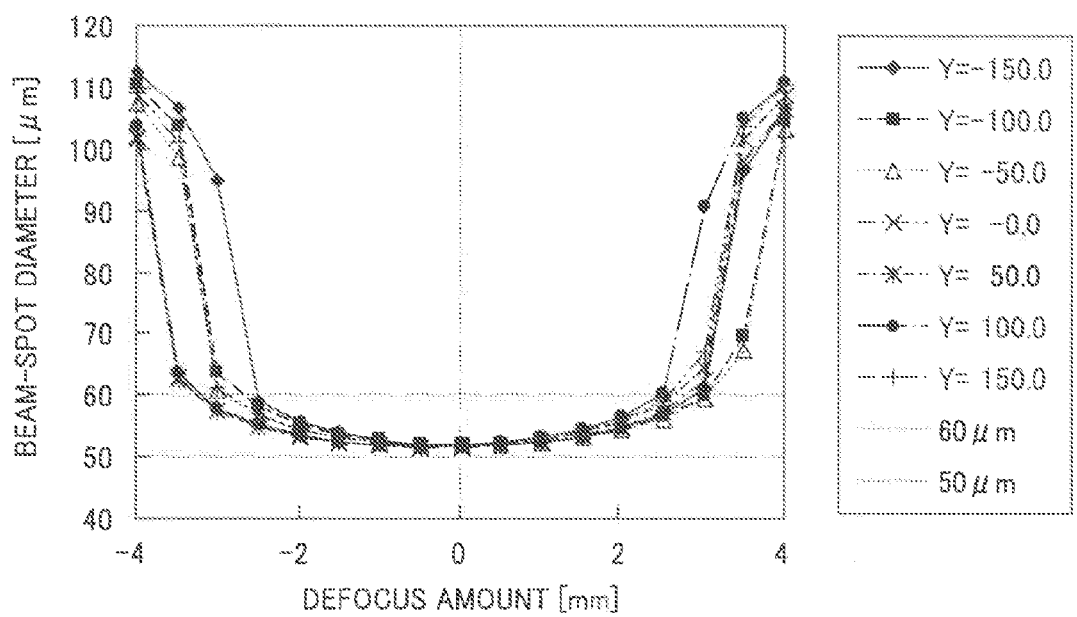

Simulation results of a relation between the beam-spot diameter and the defocus amount when an optical system with a coupling lens having a focal length of 47.7 millimeters (the lateral magnification in the main scanning direction is approximately 5.0 and that in the sub-scanning direction is 2.0) is used are shown in FIGS. 10A, 10B, 11A, 11B, 12A, 12B, 13A, and 13B. FIG. 10A depicts a beam-spot diameter in the main scanning direction when the near-field pattern regarding the main scanning direction (hereinafter, "Am") is infinite (=0), and FIG. 10B depicts a beam-spot diameter in the sub-scanning direction when a near-field pattern regarding the sub-scanning direction (hereinafter, "As") is infinite (=0). FIG. 11A depicts a beam-spot diameter in the main scanning direction where Am is 2 micrometers, and FIG. 12B depicts a beam-spot diameter in the sub-scanning direction where As is 2 micrometers. FIG. 12A depicts a beam-spot diameter in the main scanning direction where Am is 4 micrometers, and FIG. 12B depicts a beam-spot diameter in the sub-scanning direction where As is 4 micrometers. FIG. 13A depicts a beam-spot diameter in the main scanning direction where Am is 6 micrometers, and FIG. 13B depicts a beam-spot diameter in the sub-scanning direction where As is 6 micrometers.

Figure 14A:
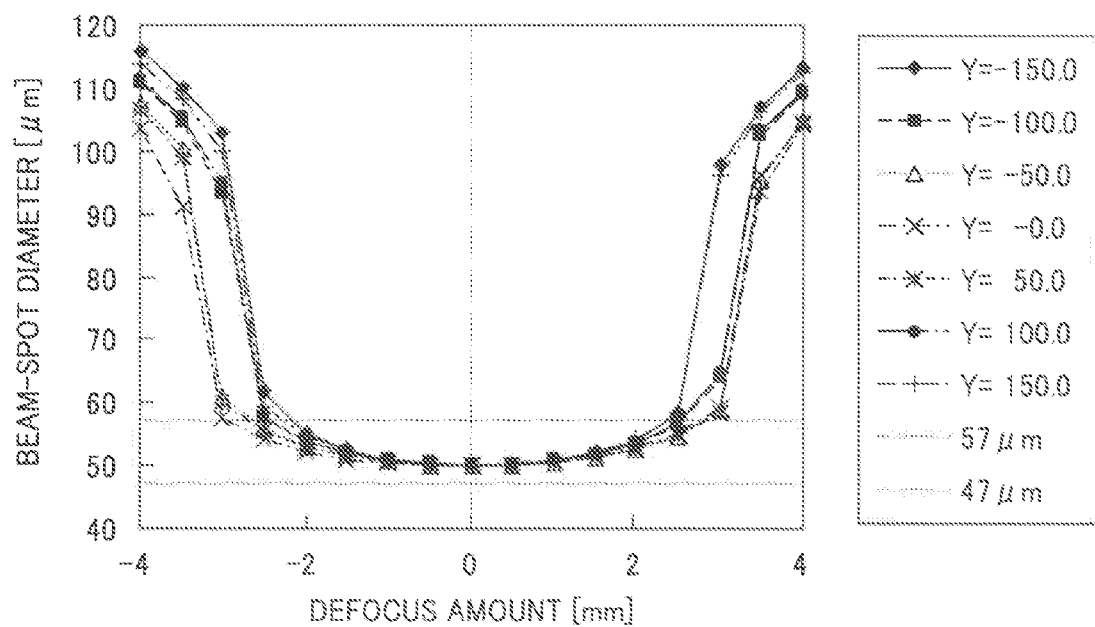
FIGS. 14A to 17B are schematic diagrams for explaining a relation between a beam-spot diameter and a defocus amount according to a conventional technology.
Figure 14B:
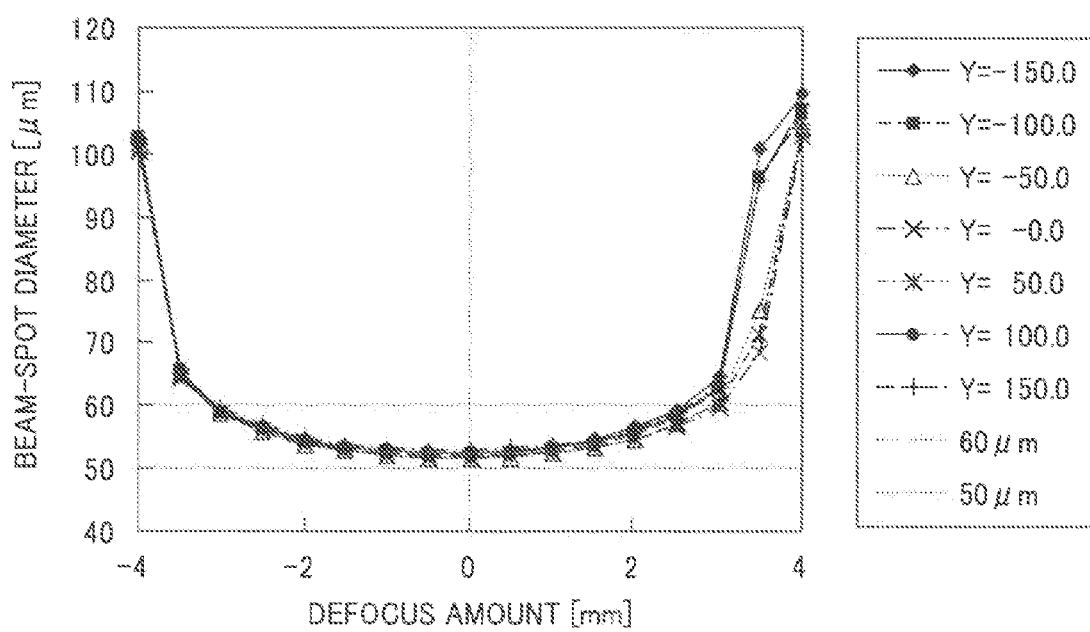
Figure 15A:
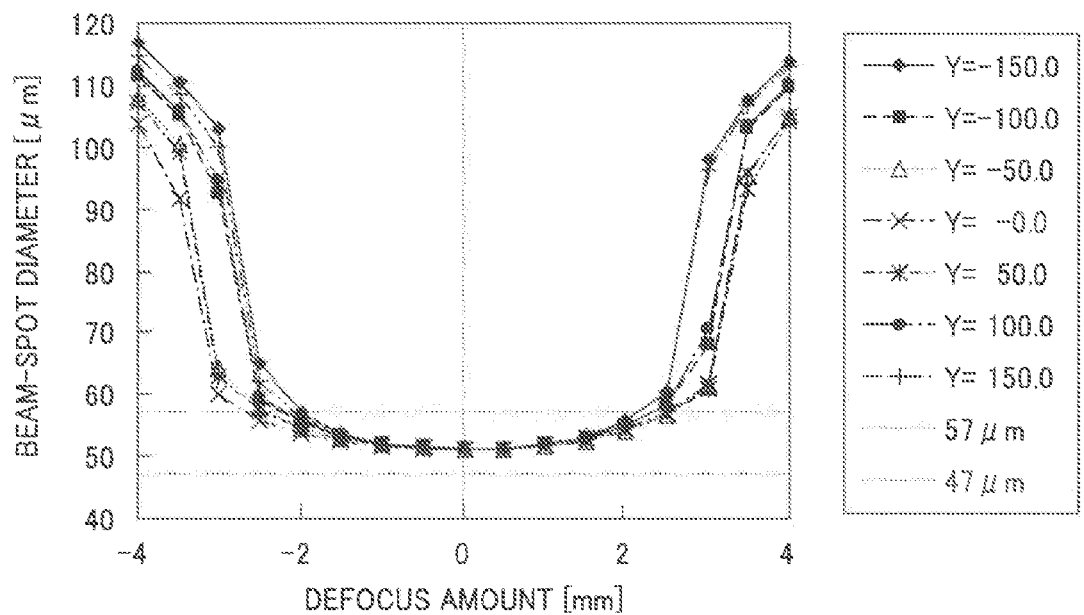
Figure 15B:
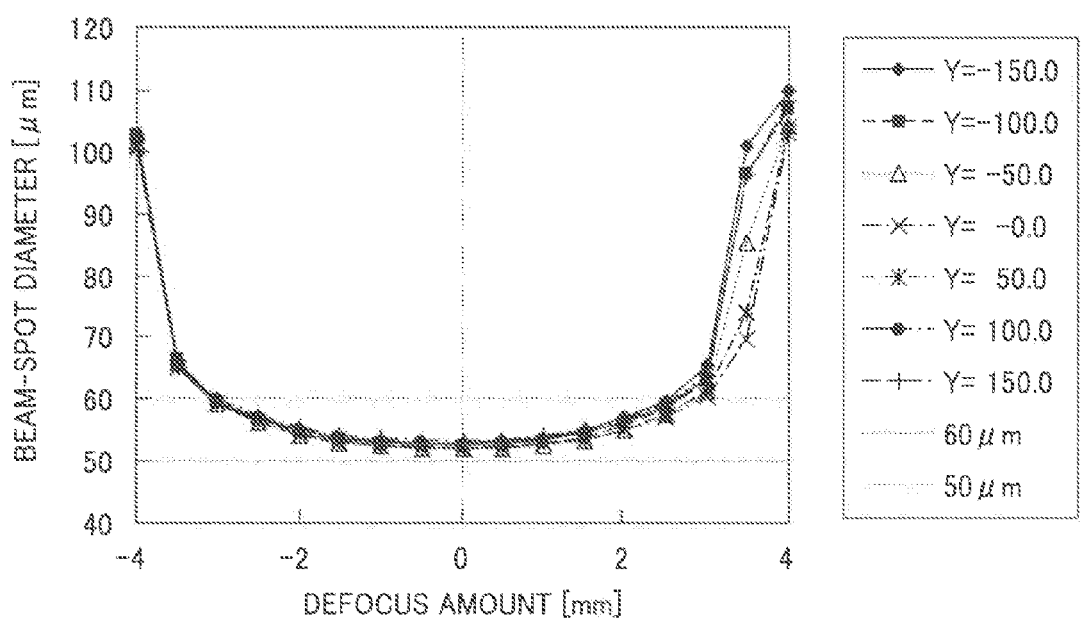
Figure 16A:
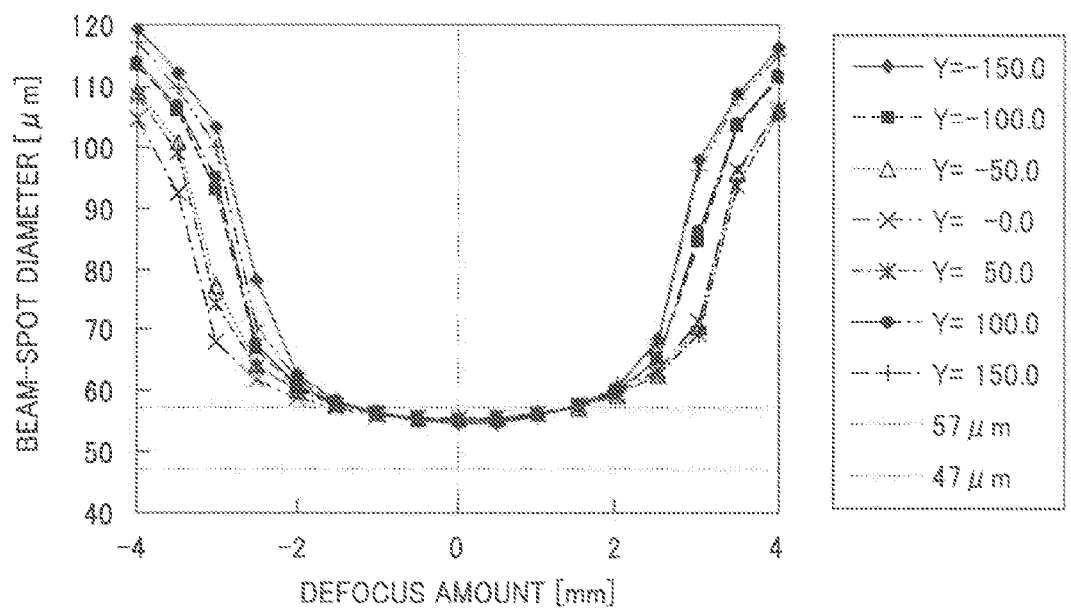
Figure 16B:
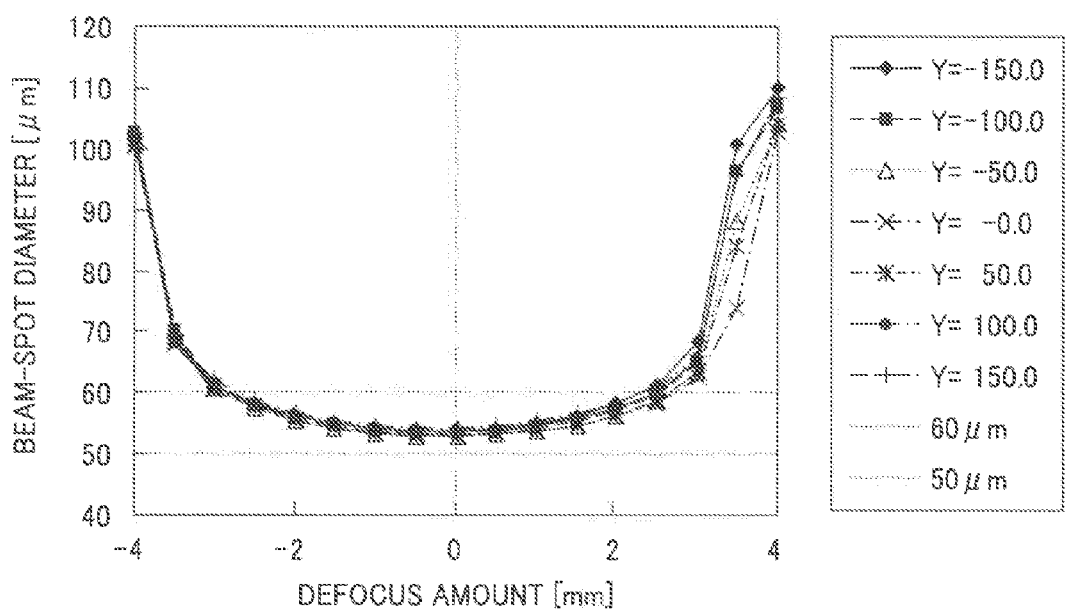
Figure 17A:
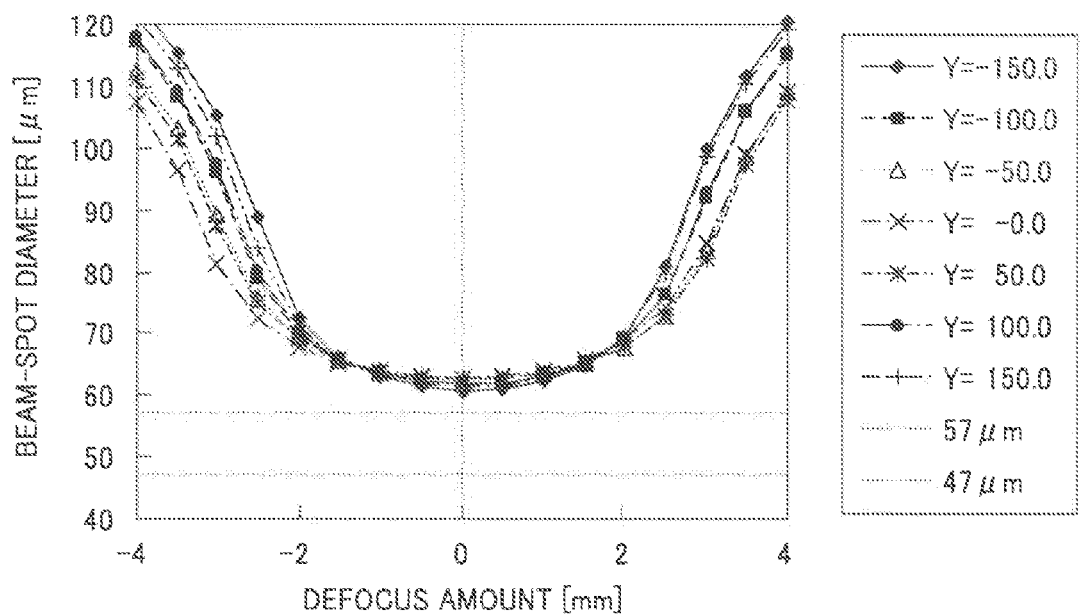
Figure 17B:
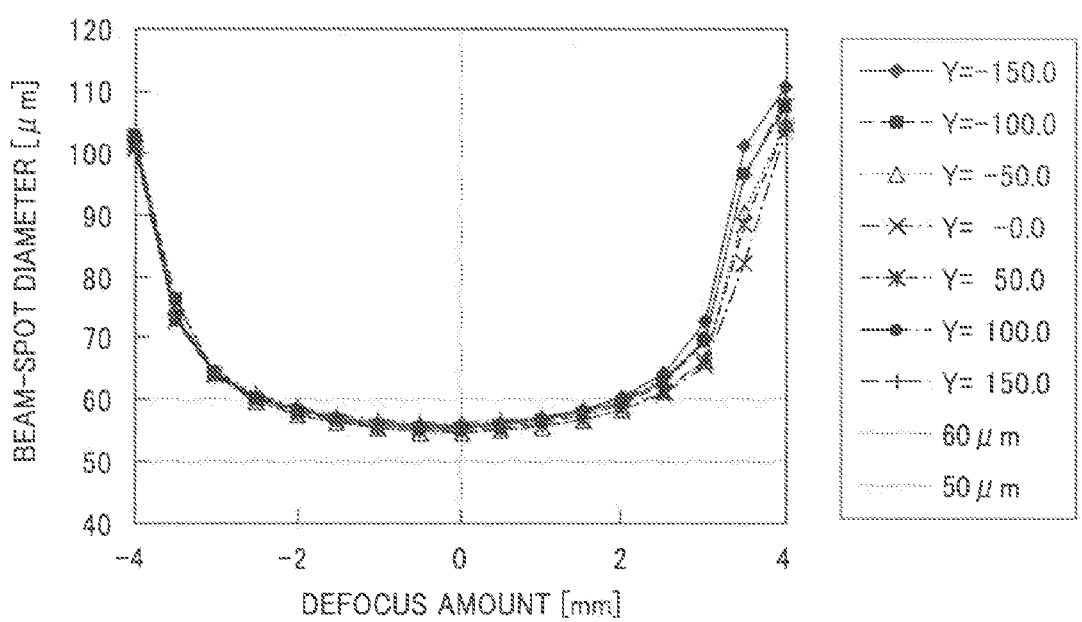

Simulation results of a relation between the beam-spot diameter and the defocus amount when a conventional optical system with a coupling lens having a focal length of 26.8 millimeters (the lateral magnification in the main scanning direction is approximately 8.9 and that in the sub-scanning direction is 4.5) is used are depicted in FIGS. 14A, 14B, 15A, 15B, 16A, 16B, 17A, and 17B. FIG. 14A depicts a beam-spot diameter in the main scanning direction where Am is infinite (=0), and FIG. 14B depicts a beam-spot diameter in the sub-scanning direction where As is infinite (=0). FIG. 15A depicts a beam-spot diameter in the main scanning direction where Am is 2 micrometers, and FIG. 15B depicts a beam-spot diameter in the sub-scanning direction where As is 2 micrometers. FIG. 16A depicts a beam-spot diameter in the main scanning direction where Am is 4 micrometers, and FIG. 16B depicts a beam-spot diameter in the sub-scanning direction where As is 4 micrometers. FIG. 17A depicts a beam-spot diameter in the main scanning direction where Am is 6 micrometers, and FIG. 17B depicts a beam-spot diameter in the sub-scanning direction where As is 6 micrometers.

In these optical systems, a target value of the beam-spot diameter regarding the main scanning direction is 52±5 micrometers and a target value of the beam-spot diameter regarding the sub-scanning direction is 55±5 micrometers. Their boundary lines are represented as broken lines in FIGS. 10A to 17B.

In the conventional optical systems, the focal depth is sufficiently ensured until Am is 2 micrometers, and fluctuations of the beam-spot diameter are not so large. However, when Am=4 micrometers or more, the focal depth is abruptly decreased in the main scanning direction, which causes the device to tend to have large fluctuations. On the other hand, in the optical system of the second embodiment, the focal depth is ensured until Am=6, and an increase in beam-spot diameter is within a tolerable range.

Thus, an optical system with a low lateral magnification is required for a light source with a near-field pattern of several micrometers or more. Because of this, as for at least one of a direction corresponding to the sub-scanning direction and a direction corresponding to the main scanning direction, the following Equation (1) is preferably satisfied:

$$\{(\omega/\beta \cdot A)^2 - \tfrac{1}{2}\}^{-2} < 0.7 \qquad (1)$$

where A is a near-field pattern, β is a lateral magnification of the entire optical system including the scanning optical system, and ω is a beam-spot diameter on the surface to be scanned.

Figure 18:
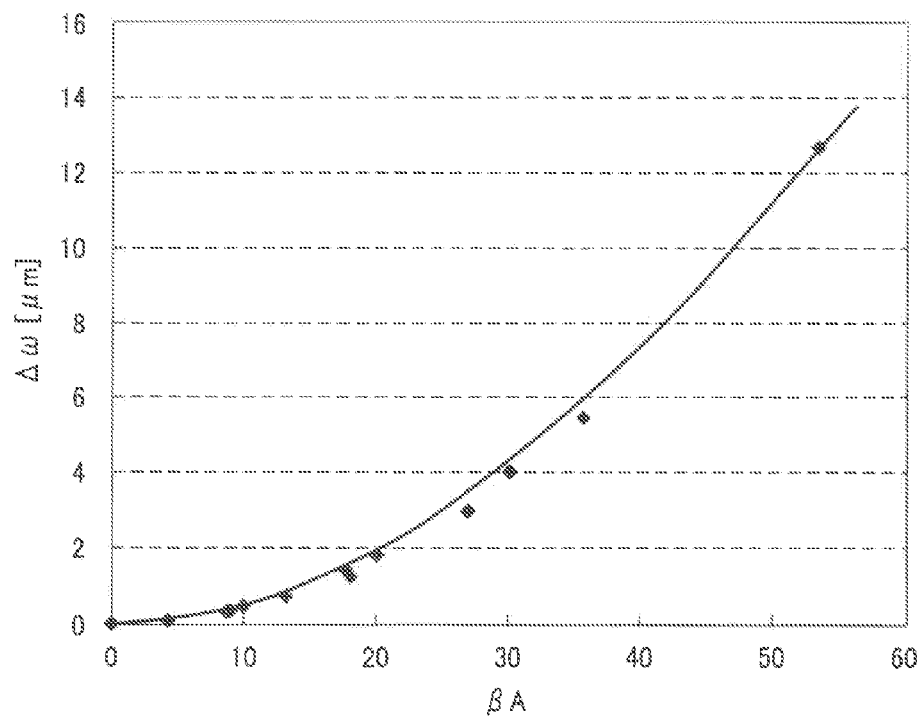
FIG. 18 is a schematic diagram for explaining a difference between a beam-spot diameter when ($\beta \times A$)=0 and a beam-spot diameter when ($\beta \times A$)>0, both with the defocus amount being 0.

This is explained referring to FIG. 18. In FIG. 18, a difference between a beam-spot diameter where (β×A)=0 (that is, A=0) and a beam-spot diameter where (β×A)>0, both with the defocus amount is 0, is found from each of FIGS. 10A to 17B, and then the results are plotted. A curve in FIG. 18 represents the following Equation (2):

$$\Delta\omega = \omega - \omega_0 = \omega_0 \left\{ \sqrt{1 + \frac{1}{2}\left(\frac{\beta A}{\omega_0}\right)^2} - 1 \right\} \quad (2)$$

where $\omega_0$ is a beam-spot diameter when A=0. A relation with the beam-spot diameter $\omega$ when A≠0 can be represented by Equation (3) as follows:

$$\omega = \sqrt{\omega_0^2 + \frac{1}{2}(\beta A)^2} \quad (3)$$

From FIG. 18, it can be found that an increase in beam-spot diameter in an actual write optical system and the above assumption excellently coincide with each other. An increase ratio δ of the beam-spot diameter generated so that A has a dimension represented by the following Equation (4):

$$\delta = \Delta\omega/\omega_0 = \sqrt{1 + \frac{1}{2}k^2} - 1 \quad (4)$$

where $k = \beta A / \omega_0$.

In the second embodiment, as for the main scanning direction, k=5.0×4/50=0.40 can be obtained. At this time, δ is suppressed to approximately 4 percent, and the beam-spot diameter regarding the main scanning direction is hardly changed, that is 52 micrometers. As for the sub-scanning direction, k=0.14, and therefore the change is smaller. As compared with $\omega_0$=55 micrometers, the beam-spot diameter is almost unchanged, that is 55.5 micrometers.

In the conventional example, as for the main scanning direction, the lateral magnification is 8.9. Therefore, k=0.712, and ω=56 micrometers, which is an increase of 10 percent or more, are obtained. Also, when the near-field pattern increases, for example, assuming that A=7 micrometers, the lateral magnification is 5, and the beam-spot diameter is 50 micrometers, k=0.7 and ω=56 micrometers are obtained. This is also undesirable for increasing image quality. If k=0.65 (for example, β=5, A=6, and $\omega_0$=50), ω=55 micrometers, which is within a change of approximately 10 percent, is obtained. Therefore, deterioration in image quality is within a tolerant range.

Therefore, at least k=βA/$\omega_0$<0.7 is preferable. At this time, a relation with an actual beam-spot diameter ω is represented by the following Equation (5) from the Equation (4):

$$k = \left\{ \left(\frac{\omega}{\beta A}\right)^2 - \frac{1}{2} \right\}^{-2} \quad (5)$$

Since the VCSEL has around 1 milliwatt to 2 milliwatts, an improvement in light output is a problem. For this problem, it has been known that a larger near-field pattern is advantageous. Even if the diameter can be increased within an area of no multimode oscillation and light output can be increased, image quality cannot be improved unless the beam-spot diameter is decreased. If Equation (5) is satisfied, the beam-spot diameter can be decreased by using the VCSEL advantageous in light amount.

In the image forming apparatus 200, when image information is received from an upper apparatus, the optical scanning device 100 is driven with modulation data based on the image information. From the light source 10, light beams modulated based on the image information are emitted. These light beams are coupled by the coupling lens 11, and then pass through the aperture member 12. With this, respective spot diameters are adjusted. Then, the light beams passing through the aperture member 12 are converged by the collimate lens 13 onto the deflecting surface of the polygon mirror 15.

Figure 19A:
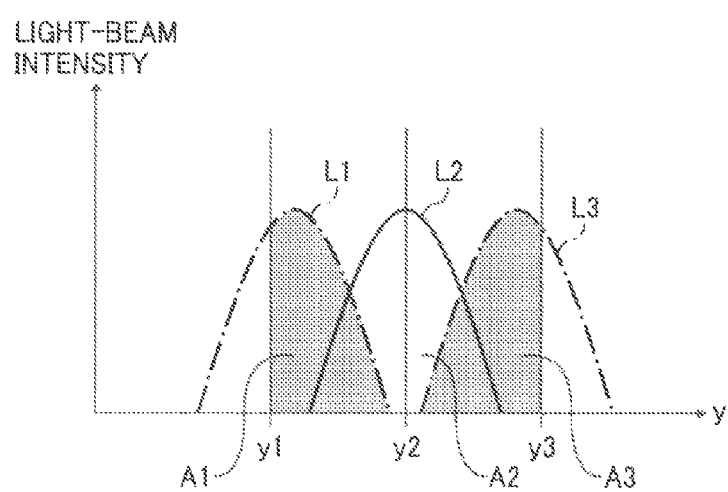
FIGS. 19A to 19C are schematic diagrams for explaining a method of equalizing the light amount of light beams incident upon a deflecting surface.

FIG. 19A is a schematic diagram for explaining intensities of light beams emitted from a $VCSEL_{13}$ positioned at the center on the first row and $VCSEL_{11}$ and $VCSEL_{15}$ positioned at both ends of the first row in the main scanning direction from out of the VCSELs formed on the light source 10 and incident upon the incident plane. The horizontal axis in FIG. 19A represents position coordinates on the incident plane in the main scanning direction, whilst the vertical axis represents intensities of the light beams. Also, y2 represents position coordinates on the deflecting surface of the polygon mirror 15 at the center in the main scanning direction, and y1 and y3 represent position coordinates on the deflecting surface thereof at both ends in the main scanning direction. Furthermore, for convenience, the light beams from the $VCSEL_{11}$, the $VCSEL_{13}$, and $VCSEL_{15}$ are referred to as light beams $LB_{11}$, $LB_{13}$, and $LB_{15}$.

When the area near the center point O of the writing area of the photosensitive drum 201 is scanned with the light beams $LB_{11}$, $LB_{13}$, and $LB_{15}$ having the same intensity, each of the light beams $LB_{11}$, $LB_{13}$, and $LB_{15}$ is deflected onto a deflecting surface approximately parallel to a ZY plane. The intensity distributions on the incident planes of the light beams $LB_{11}$, $LB_{13}$, and $LB_{15}$ are represented by curves L1, L2, and L3, respectively, in FIG. 19A. Of three light beams $LB_{11}$, $LB_{13}$, and $LB_{15}$, two light beams $LB_{11}$ and $LB_{15}$ are only partially incident upon the deflecting surface. Therefore, the light amount of the light beam $LB_{11}$ after reflection upon the deflecting surface is proportional to an area A1 (shaded portion in FIG. 19A) defined by the curve L1, a straight line passing the position y1 and perpendicular to the Y axis, and the Y axis, whilst the light amount of the light beam $LB_{15}$ after reflection upon the deflecting surface is proportional to an area A3 (shaded potion in FIG. 19A) defined by the curve L3, a line passing the position y2 and perpendicular to the Y axis, and the Y axis. On the other hand, the light beam $LB_{13}$ is entirely incident upon the deflecting surface. Therefore, the light amount after reflection upon the deflecting surface is proportional to the area A2 defined by the curve L2 and the Y axis.

Figure 19B:
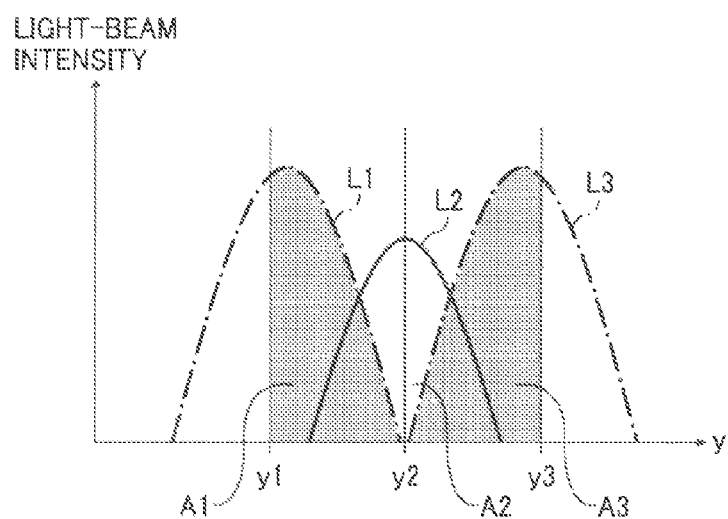

Therefore, according to the second embodiment, the $VCSEL_{11}$, the $VCSEL_{13}$, and $VCSEL_{15}$ are driven so that the intensity of each of the two light beams $LB_{11}$ and $LB_{15}$ is larger than the intensity of two light beam $LB_{13}$. For example, as shown in FIG. 19B, the $VCSEL_{11}$, the $VCSEL_{13}$, and $VCSEL_{15}$ are driven so that peak values of the two curves L1 and L3 are larger than the peak value of the curve L2 so that each of the areas A1 and A3 and the area A2 are approximately equal to each other. With this, the light amounts of three light beams $LB_{11}$, $LB_{13}$, and $LB_{15}$ reflected upon the reflection plane are equal. Each of the light beams $LB_{11}$ and $LB_{15}$ has a light amount of 120 percent with respect to the light beam $LB_{13}$, which substantially equalizes the light amounts of the reflected light beams.

Figure 19C:
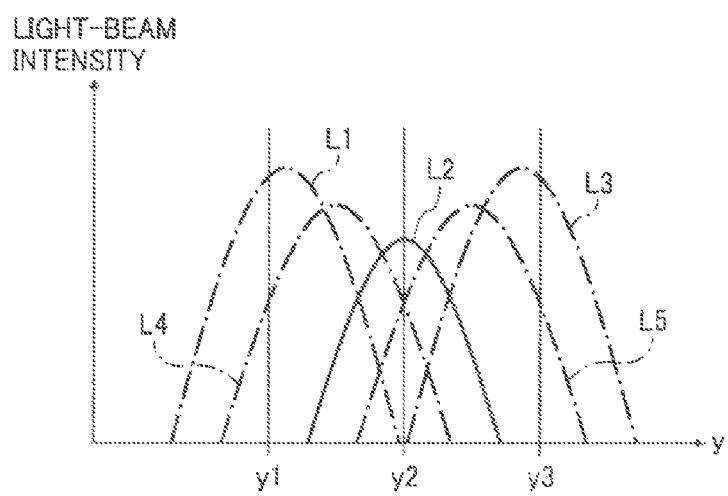

Also, as for a $VCSEL_{12}$ and a $VCSEL_{14}$ disposed on the first row in the light source 10, as represented by curves L4 and L5 in FIG. 19C, for example, the light amount of each of the light beams reflected upon the reflection plane is equal to the light amount of the light beam $LB_{13}$ reflected upon the reflection plane by controlling in a manner such that the intensity of the emitted light beam is stronger than the intensity of the light beam $LB_{13}$. Also, as for a $VCSEL_{21}$ to a $VCSEL_{85}$ on the second to eighth rows, as with the VCSELs on the first row, each VCSEL is controlled in a manner such that the intensity of a light beam emitted from a VCSEL disposed toward both end in the main scanning direction is stronger than the intensity of the light beam emitted from the $VCSEL_{m3}$ disposed at the center in the main scanning direction. With this, the light amounts of the light beams emitted from the VCSELs of the light source 10 and deflected on the deflecting surface of the polygon mirror 15 are substantially equalized.

As explained above, for each light beam deflected upon the deflecting surface of the rotating polygon mirror 15, a moving speed of a spot of the light beam in the main scanning direction and others are adjusted by the first scanning lens 16 and the second scanning lens 17. With this state, the light beams are focused on the surface of the photosensitive drum 201.

As explained above, according to the second embodiment, the light amount of the light beams deflected on the deflecting surface are substantially uniform. Therefore, scanning of the writing area of the photosensitive drum 201 is performed with a plurality of light beams with the same light amount. Thus, scanning is performed over the entire writing area without unevenness.

A distance L from the coupling lens 11 to the polygon mirror 15 is set as 122.82 millimeters, which is smaller than that of the conventional technology, so that the light beam from the most-outside VCSEL is nearby on the deflecting surface of the polygon mirror 15.

Because a focal length f of the coupling lens 11 is 47.7 millimeters, L/f is larger than 1 and smaller than 4. As for the light-amount distribution, it is preferable that light beams be not separated on the deflecting surface of the polygon mirror 15 in the main scanning direction. Only in consideration of this, different conditions for the light beams on the deflecting surface, that is, L/f=1, are desirable. However, if the distance between the coupling lens 11 and the polygon mirror 15 is too short, the focal length of the collimate lens 13 is also short, which makes it difficult to take aberration. For this reason, in consideration of the condition in which the light beam farthest away in the main scanning direction is not too far and he condition in which the focal length of the collimate lens 13 is balanced, the value of L/f is larger than 1 and smaller than 4.

The optical scanning device of the above embodiments is explained as being applied to a single-color image forming apparatus. However, the optical scanning device can be applied to a color image forming apparatus such as a tandem color machine including a plurality of photosensitive drums.

Figure 20:
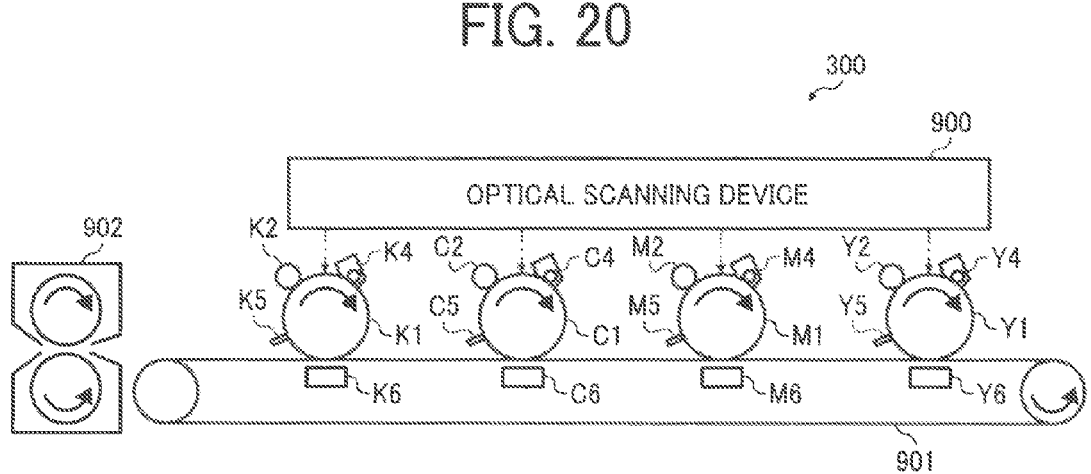
FIG. 20 is a schematic diagram of a multicolor image forming apparatus.
Figure 21:
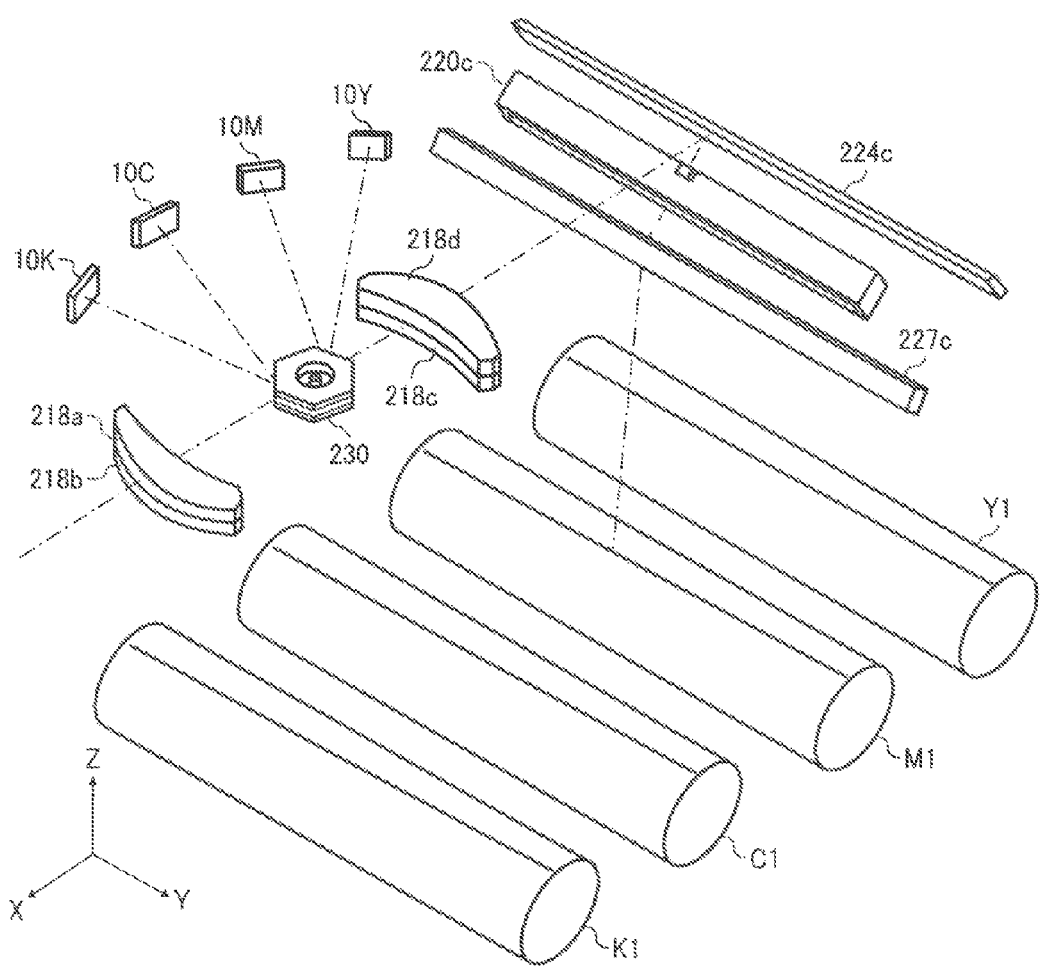
FIG. 21 is a perspective view of an optical scanning device shown in FIG. 20.
Figure 22:
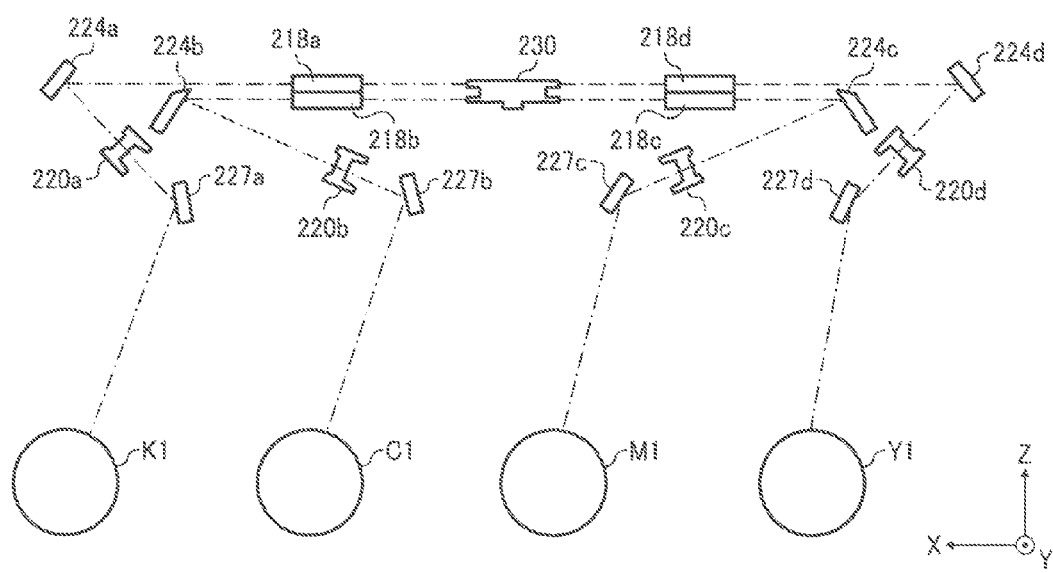
FIG. 22 is a side view of the optical scanning device.

A multicolor image forming apparatus 300 capable of forming a color image and including a plurality of photosensitive drums is explained referring to FIGS. 20 to 22. As shown in FIG. 20, the multicolor image forming apparatus 300 includes a photosensitive drum K1, a charger K2, a developer K4, a cleaning unit K5, and a transfer charging unit K6 for black (K); a photosensitive drum C1, a charger C2, a developer C4, a cleaning unit C5, and a transfer charging unit C6 for cyan (C); a photosensitive drum M1, a charger M2, a developer M4, a cleaning unit M5, and a transfer charging unit M6 for magenta (M); a photosensitive drum Y1, a charger Y2, a developer Y4, a cleaning unit Y5, and a transfer charging unit Y6 for yellow (Y); an optical scanning device 900; a transfer belt 901, and a fixing unit 902.

Each of the photosensitive drums K1, C1, M1, and Y1 rotates in a direction indicated by an arrow in FIG. 20, and the charger (K2, C2, M2, and Y2), the developer (K4, C4, M4, and Y4), the transfer charging unit (K6, C6, M6, and Y6), and the cleaning unit (K5, C5, M5, and Y5) are arranged around it in this order. The chargers K2, C2, M2, and Y2 uniformly charge the surface of the corresponding photosensitive drums K1, C1, M1, and Y1. The optical scanning device 900 irradiates the photosensitive drums K1, C1, M1, and Y1 charged by the charger K2, C2, M2, and Y2 with light, thereby forming an electrostatic latent image on the surfaces thereof. The electrostatic latent image is developed into a toner image by corresponding one of the developing units K4, C4, M4, and Y4. The toner images of respective colors are transferred onto a recording sheet by the transfer chargers K6, C6, M6, and Y6, and superimposed to form a full-color image. The full-color image is fixed on the sheet by the fuser 902.

Next, the optical scanning device 900 is explained referring to FIGS. 21 and 22.

The optical scanning device 900 includes light-source units 10K, 10C, 10M, and 10Y, and also includes, as with the optical scanning device 100, the coupling lens 11, the aperture member 12, and others. Also provided are, for example, an optical system (not shown) that guides light beams from the light-source units 10K, 10C, 10M, and 10Y to a polygon mirror 230, the polygon mirror 230, first scanning lenses 218a, 218b, 218c, and 218d, folding mirrors 224a, 224b, 224c, 224d, 227a, 227b, 227c, and 227d, and second scanning lenses 220a, 220b, 220c, and 220d. only part of the optical scanning device 900 is shown in FIGS. 21 and 22 for convenience.

The light-source units 10K, 10C, 10M, and 10Y each includes the light source 10. The light-source unit 10K emits a laser beam modulated according to black image information (hereinafter, also referred to as "black beam"). The light-source unit 10C emits a laser beam modulated according to cyan image information (hereinafter, also referred to as "cyan beam"). The light-source unit 10M emits a laser beam modulated according to magenta image information (hereinafter, also referred to as "magenta beam"). The light-source unit 10Y emits a laser beam modulated according to yellow image information (hereinafter, also referred to as "yellow beam").

The first scanning lens 218a, the folding mirror 224a, the second scanning lens 220a, and the folding mirror 227a correspond to the black beam, respectively.

The first scanning lens 218b, the folding mirror 224b, the second scanning lens 220b, and the folding mirror 227b correspond to the cyan beam, respectively.

The first scanning lens 218c, the folding mirror 224c, the second scanning lens 220c, and the folding mirror 227c correspond to the magenta beam, respectively.

The first scanning lens 218d, the folding mirror 224d, the second scanning lens 220d, and the folding mirror 227d correspond to the yellow beam, respectively.

The laser beams emitted from the light-source units converge in the sub-scanning direction so as to have a linear shape on the deflecting surface of the polygon mirror 230. The deflecting point of the polygon mirror 230 and the light-gathering point on the surface of the relevant photosensitive drum are conjugated each other.

The polygon mirror 230 is formed of six-surface mirrors with a two-stage structure. On a six-surface mirror at the first stage, the black beam from the light-source unit 10K and the yellow beam from the light-source unit 10Y are deflected. On a six-surface mirror at the second stage, the magenta beam from the light-source unit 10M and the cyan beam from the light-source unit 10C are deflected. That is, all laser beams are deflected by the single polygon mirror 230.

The first scanning lens 218a and the first scanning lens 218b are disposed at one side of the polygon mirror 230 (+X side), whilst the first scanning lens 218c and the first scanning lens 218*d* are disposed at the other side of the polygon mirror 230 (−X side). Also, the first scanning lens 218*a* and the first scanning lens 218*b*, and the first scanning lens 218*c* and the first scanning lens 218*d* are laminated in a direction corresponding to the sub-scanning direction (Z-axis direction).

The black beam from the first scanning lens 218*a* forms an image in a spot shape on the photosensitive drum K1 through the folding mirror 224*a*, the second scanning lens 220*a*, and the folding mirror 227*a*.

The cyan beam from the first scanning lens 218*b* forms an image in a spot shape on the photosensitive drum C1 through the folding mirror 224*b*, the second scanning lens 220*b*, and the folding mirror 227*b*.

The magenta beam from the first scanning lens 218*c* forms an image in a spot shape on the photosensitive drum M1 through the folding mirror 224*c*, the second scanning lens 220*c*, and the folding mirror 227*c*.

The yellow beam from the first scanning lens 218*d* forms an image in a spot shape on the photosensitive drum Y1 through the folding mirror 224*d*, the second scanning lens 220*d*, and the folding mirror 227*d*.

The folding mirrors are disposed so that optical path lengths each from the polygon mirror 230 to the relevant photosensitive drum are equal to one another and incident positions and angles of incidence of the laser beams at the respective photosensitive drums are identical to one another.

In the multicolor image forming apparatus constructed in the manner explained above, with light beams with their light amounts being uniformly adjusted, latent images are formed on the respective photosensitive drums K1, C1, M1, and Y1. Therefore, a high-definition multicolor image can be accurately formed on a recording medium.

The optical scanning device of the above embodiments is explained as being applied to a printer. The optical scanning device, however, can also be applied to other image forming apparatuses, such as copiers, facsimile machines, and multifunction products that combine any or all of the functions of these.

As set forth hereinabove, according to an embodiment of the present invention, unevenness of the distribution of the light amount of light beams after reflected upon a deflecting surface can be prevented. As a result, it is possible to scan a surface to be scanned with high accuracy. Thus, an image can be formed on a recording medium with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a first optical system that includes a coupling lens that couples a plurality of light beams;
a deflector that includes a deflecting surface for deflecting the light beams having passed through the coupling lens; and
a second optical system that focuses the light beams deflected by the deflector on a to-be-scanned surface, the to-be-scanned surface including a writing area that is scanned with the light beams from a write-start position to a write-end position in a main scanning direction, wherein
a focal length of the coupling lens with respect to a distance between the deflecting surface and the coupling lens is larger than 1 and smaller than 4, and
a size of the deflecting surface in the main scanning direction is smaller than a width of a light flux of the light beams in the main scanning direction,
wherein intensities of the light beams increase from a light beam at a center in the main scanning direction toward a light beam at the write-start position and a light beam at the write-end position.

2. The optical scanning device according to claim 1, further comprising a light-source unit that includes a plurality of light-emitting areas for emitting light beams, the light-emitting areas being two-dimensionally arranged, wherein $\{(\omega/(\beta \cdot A))^2 - 1/2\}^{-2} < 0.7$ is satisfied where A is a size of a near-field pattern of the light-emitting areas in the main scanning direction, $\beta$ is magnification of an optical system including the first optical system and the second optical system in the main scanning direction, and $\omega$ is a diameter of a beam spot formed by a light beam on the to-be-scanned surface.

3. The optical scanning device according to claim 1, wherein the light emitting areas are arranged so that a distance between light emitting units farthest away from each other in the sub-scanning direction is larger than a distance between light emitting areas farthest away from each other in the main scanning direction.

4. An image forming apparatus comprising:
the optical scanning device according to claim 1;
a photosensitive element on which a latent image is formed based on image data by the optical scanning device;
a developing unit that develops the latent image into a toner image; and
a transferring unit that transfers the toner image onto a recording medium; and
a fixing unit that fixes the toner image on the recording medium.

5. The image forming apparatus according to claim 4, wherein the image-forming optical system causes main light beams of the light beams to cross near the deflecting surface in the main scanning direction.

6. An image forming apparatus comprising:
the according to claim 1;
a plurality of photosensitive elements on which latent images of different colors are formed based on image data by the optical scanning device;
a developing unit that develops the latent images into toner images;
a transferring unit that transfers the toner images onto a recording medium in a superimposed manner to obtain a multicolor image; and
a fixing unit that fixes the multicolor image on the recording medium.

7. The image forming apparatus according to claim 6, wherein the image-forming optical system causes main light beams of the light beams to cross near the deflecting surface in the main scanning direction.

8. The optical scanning device according to claim 1, wherein the image-forming optical system causes main light beams of the light beams to cross near the deflecting surface in the main scanning direction.

* * * * *